United States Patent
Gzara

(10) Patent No.: US 9,103,926 B2
(45) Date of Patent: Aug. 11, 2015

(54) CORRECTED POROSITY MEASUREMENTS OF UNDERGROUND FORMATIONS

(75) Inventor: Kais B. M. Gzara, Tunis (TN)

(73) Assignee: Schlumberger Technology Corporation, Sugar Land, TX (US)

( * ) Notice: Subject to any disclaimer, the term of this patent is extended or adjusted under 35 U.S.C. 154(b) by 344 days.

(21) Appl. No.: 13/521,278

(22) PCT Filed: Jan. 13, 2011

(86) PCT No.: PCT/EP2011/050423
§ 371 (c)(1),
(2), (4) Date: Aug. 19, 2012

(87) PCT Pub. No.: WO2011/086145
PCT Pub. Date: Jul. 21, 2011

(65) Prior Publication Data
US 2013/0047717 A1 Feb. 28, 2013

(30) Foreign Application Priority Data
Jan. 14, 2010 (EP) .................................. 10150809

(51) Int. Cl.
*E21B 49/08* (2006.01)
*G01V 5/10* (2006.01)
*E21B 47/12* (2012.01)
*E21B 47/01* (2012.01)

(52) U.S. Cl.
CPC . *G01V 5/10* (2013.01); *E21B 47/01* (2013.01); *E21B 47/12* (2013.01)

(58) Field of Classification Search
CPC .......... E21B 47/12; E21B 47/01; E21B 47/00
USPC .................................................. 73/152.03
See application file for complete search history.

(56) References Cited

U.S. PATENT DOCUMENTS

| 3,817,328 A | | 6/1974 | Neuman | |
|---|---|---|---|---|
| 4,584,874 A | * | 4/1986 | Ruhovets | 73/152.06 |
| 4,791,797 A | * | 12/1988 | Paske et al. | 73/152.03 |
| 4,833,914 A | * | 5/1989 | Rasmus | 73/152.03 |

(Continued)

FOREIGN PATENT DOCUMENTS

| EP | 871045 | 10/1998 |
|---|---|---|
| EP | 0864883 | 5/2012 |
| GB | 2183831 | 6/1987 |
| GB | 2838135 | 6/2003 |
| GB | 2409729 | 7/2005 |
| RU | 2330311 | 7/2008 |

OTHER PUBLICATIONS

1st Office Action for the equivalent Russian patent application No. 2012134631 issued on Feb. 19, 2014.

(Continued)

*Primary Examiner* — Hezron E Williams
*Assistant Examiner* — Rodney T Frank
(74) *Attorney, Agent, or Firm* — Stephanie Chi; Wesley Noah

(57) ABSTRACT

This disclosure relates to methods and apparatuses for determining the porosity of a formation surrounding a borehole. A drilling fluid penetrates a distance into the formation as a function of time. First and second porosity measurements are taken, both at a first time and at a second time. The first porosity measurement is of a type selected to indicate a different porosity measurement in the presence of a gas as compared to the second porosity measurement. The first and second porosity measurements are selected to have substantially the same depth-of-investigation into the formation and are affected approximately proportionally by the gas.

12 Claims, 10 Drawing Sheets

(56) References Cited

U.S. PATENT DOCUMENTS

| | | | |
|---|---|---|---|
| 5,045,693 | A | 9/1991 | McKeon et al. |
| 7,059,428 | B2 * | 6/2006 | Frey et al. ............... 175/50 |
| 2002/0008197 | A1 | 1/2002 | Michael |
| 2003/0205082 | A1 | 11/2003 | Herron et al. |
| 2004/0060351 | A1 * | 4/2004 | Gunter et al. ............ 73/152.05 |
| 2008/0221799 | A1 * | 9/2008 | Murray ................... 702/11 |
| 2009/0177403 | A1 | 7/2009 | Gzara |

OTHER PUBLICATIONS

Schlumberger: "Log interpretation principles/applications—Chapter 5, Porosity Logs", Dec. 31, 1991, pp. 5-1-5-24.

Decision on grant for the equivalent Russian patent application No. 2012134631 issued on Jun. 26, 2014.

Examination report for the equivalent Australian patent application No. 2011206593 issued on Aug. 29, 2014.

* cited by examiner

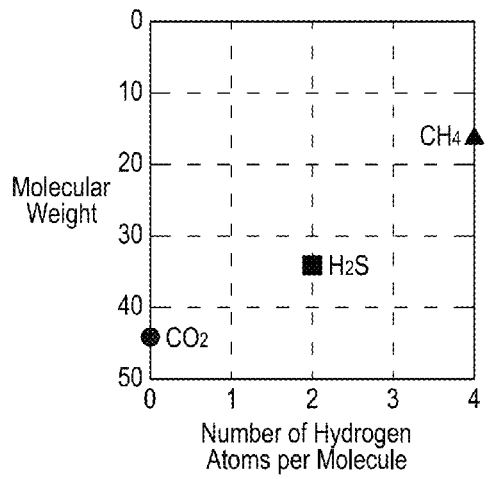 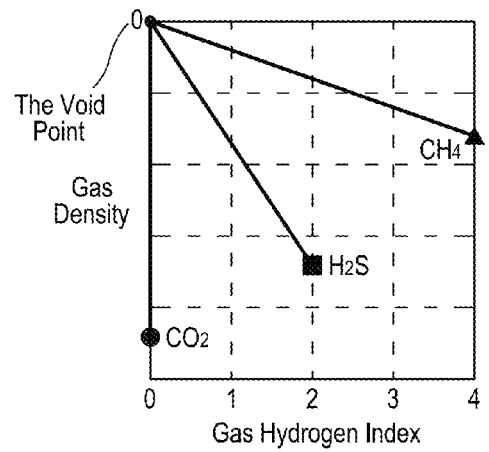
FIG. 3a  FIG. 3b
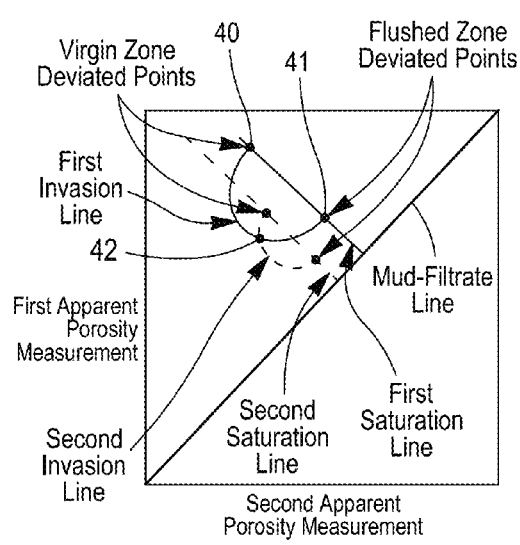 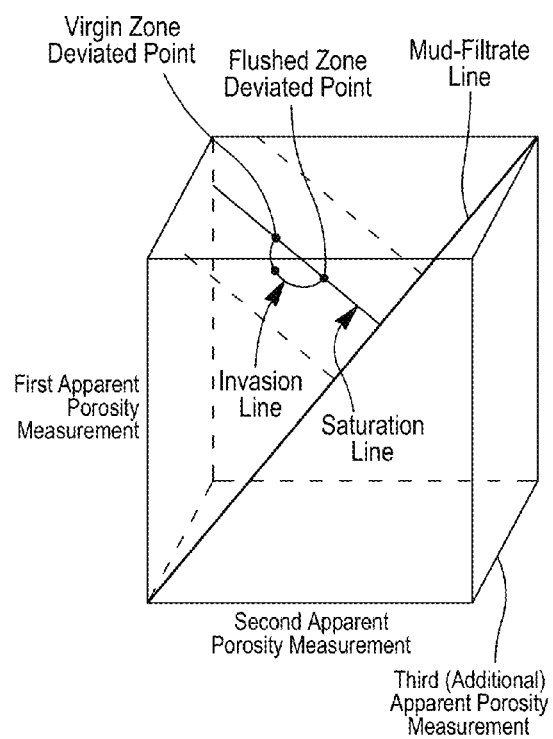
FIG. 4a  FIG. 4b

Ratio of the change in measured formation density (in "g/cc") to the change in measured formation neutron porosity (in "pu"), where the change is considered in-between the while drilling (WD) and after drilling (AD) passes

CORRECTED POROSITY MEASUREMENTS OF UNDERGROUND FORMATIONS

FIELD

This disclosure relates to measurement of porosity in underground formations, and in particular but not exclusively, to providing a correct porosity that is able to take into account the presence of a particular or unknown type of fluid in the formations, or to take into account shallow or unknown incomplete mud-filtrate invasion.

BACKGROUND

The measurement of porosity, i.e., the quantification of the volume of the formation that is made up of pore space rather than solid rock matrix, is one of the key measurements used to quantify oil and gas reserves in the underground formation, or to quantify the underground volume capacity for various underground storage or disposal applications.

The pores in underground formations are typically filled with a mixture of water and hydrocarbon(s) molecules in the liquid state, but may comprise as well $H_2S$, $CO_2$, $N_2$, etc. molecules and may consist more generally of a mixture of solid, liquid and gas phases in mechanical and thermodynamic equilibrium. Moreover, if solvents are present (such as water), then salts (such as NaCl or KCl/etc.) are usually also present as solute, and the corresponding solution ions may alter the various characteristics of the solvent, in significant ways.

Thus, one of the issues that traditionally affect the measurement of porosity is the kind of substances present inside in the pores of the formation. This is because there does not exist an ideal and standalone porosity measurement that would always read correct underground formation porosity, irrespective of the substances present inside the pore space. Hydrogen Index (HI) measurements for example, which are sensitive to the number of hydrogen atoms in the pore space, may provide a means to estimate underground formation porosity, when only water and oil are present in the pores. However, problems occur in the presence of a gas in the pores, because gas will have substantially fewer hydrogen atoms per unit volume, as compared to water and oil, which have roughly similar HI. Another example is that of Density (rho) measurements, which are sensitive to the density of the substances present inside the pore space, and may provide a means to estimate underground formation porosity, when only water and oil are present in the pores, provided the density of the rock matrix is also known. However, problems occur also in the presence of gas in the pores, because gas is significantly lighter than water and oil, which have roughly similar density. Consequently, an increase in gas-filled porosity will lead to both a decrease in Hydrogen Index and a decrease in Density, which would respectively indicate a reduced apparent porosity as derived from the Hydrogen Index measurement, and an increased apparent porosity as derived from the Density measurement; the so-called cross-over effect. The chemical composition and the pressure and temperature of each gas, have a direct bearing for example on the average number of hydrogen atoms per molecule of gas, and on the gas density, which will also affect the apparent porosity measurements such as derived from the Hydrogen Index measurement and the Density measurement.

A further issue which affects correct porosity measurement is the invasion of the drilling mud filtrate into the underground formation. Specifically, in LWD (Logging While Drilling) applications this is most noticeable, since the LWD measurements are typically acquired a few minutes to a few hours only after underground formation have been freshly drilled. As such, the drilling mud filtrate will have invaded into the formation only up to a few inches or so. As time progresses, the drilling mud filtrate penetrates deeper into the formation, which may affect certain measurements and result in invasion-dependent or time-dependent measurement readings. Specifically, in the situation of an LWD tool relying on multiple measurements each having a different radial depth-of-investigation into the formation, then these measurements would be affected differently by the mud-filtrate invasion profile into the formation, especially when the radial depth-of-investigation of a first measurement is within the Invaded Zone, whereas the other measurement has a radial depth-of-investigation that extends beyond the Invaded Zone (i.e., into the Virgin Zone) and is thus typically less affected by invasion. Traditionally, most of the techniques dealing with the estimation of porosity in underground formations were developed for WL (Wireline) applications, prior to the advent of LWD logging. And because WL measurements are usually acquired days after the borehole has been drilled, the Invaded Zone typically extends a foot or more into the underground formation at that time, and invasion issues are not of as great concern as for LWD measurements.

SUMMARY

An object of this disclosure is to provide a corrected porosity measurement that addresses some of the aforesaid issues.

According to a first aspect there is provided a method of determining a porosity of a formation surrounding a borehole, the method comprising the steps of: obtaining a first porosity measurement and a second porosity measurement, wherein the first and second porosity measurements are different types of porosity measurements that provide different porosity measurement values in the presence of a gas having a known characteristic; and determining the porosity of the formation using the first and second porosity measurements and the known gas characteristic, for example, from an intersection point between a curve of the known gas characteristic passing through a data point representing the first and second porosity measurements and a line representing formation porosity values in the absence of the gas.

According to a further aspect there is provided a method of determining a porosity of a formation surrounding a borehole, the method comprising the steps of: injecting a drilling fluid that penetrates a distance into the formation as a function of time; obtaining a first porosity measurement and a second porosity measurement at substantially the same time and substantially the same depth-of-investigation into the formation, wherein the first porosity measurement is of a type selected to indicate a different porosity measurement in the presence of a gas as compared to the second porosity measurement, said gas having a known characteristic; and determining the porosity of the formation using the first and second porosity measurements and the known gas characteristic, for example from an intersection point between a curve of the known gas characteristic passing through a data point representing the first and second porosity measurements and a line representing formation porosity values in the absence of the gas.

According to yet a further aspect there is provided a method of determining a porosity of a formation surrounding a borehole, the method comprising the steps of: injecting a drilling fluid that penetrates a distance into the formation as a function of time; obtaining a first porosity measurement and a second porosity measurement, both porosity measurements taken at a first time and at a second time, wherein the first porosity measurement is of a type selected to indicate a different porosity measurement in the presence of a gas as compared to the second porosity measurement, and wherein the first and second porosity measurements are selected to have substantially the same depth-of-investigation into the formation and are affected approximately proportionally by the gas; and determining the porosity of the formation using the first and second porosity measurements, for example, from an intersection point between a line connecting two data points representing the first and second porosity measurements respectively taken at the first and second times and a line representing formation porosity values in the absence of the gas.

According to a further aspect there is provided a method of determining a porosity of a formation surrounding a borehole, the method comprising the steps of: injecting a drilling fluid that penetrates a distance into the formation as a function of time; obtaining a first porosity measurement and a second porosity measurement, both porosity measurements taken at a first time and at a second time, wherein the first porosity measurement is of a type selected to indicate a different porosity measurement in the presence of a gas as compared to the second porosity measurement, and wherein the first and second porosity measurements are selected to have substantially the same depth-of-investigation into the formation and are affected approximately proportionally by the gas; and determining the porosity of the formation using the first and second porosity measurements and the distance of penetration of the drilling fluid into the formation, for example, by combining the first and second porosity measurements with the distance of penetration of the drilling fluid into the formation to compute measurements respectively corresponding to virgin zone only and flushed zone only; and determining the porosity of the formation from an intersection point between a line connecting two data points representing the computed measurements respectively corresponding to virgin zone only and flushed zone only and a line representing formation porosity values in the absence of the gas.

According to yet a further aspect there is provided a method of determining a porosity of a formation surrounding a borehole, the method comprising the step of: injecting a drilling fluid that penetrates a distance into the formation as a function of time; obtaining a first porosity measurement and a second porosity measurement at substantially the same time and substantially the same depth-of-investigation into the formation, wherein the first and second porosity measurements are different types of porosity measurements that provide different porosity measurement values in the presence of a gas having a known characteristic; obtaining a third porosity measurement at a substantially dissimilar depth-of-investigation to the first and second porosity measurements and at substantially the same time when the first and second porosity measurements are obtained; and determining the porosity of the formation using the first, second and third porosity measurements and the distance of penetration of the drilling fluid into the formation, for example, by combining the first, second and third porosity measurements with the distance of penetration of the drilling fluid into the formation to compute measurements respectively corresponding to virgin zone only and flushed zone only; and determining the porosity of the formation from an intersection point between a curve of the known gas characteristic passing through two data points representing the computed measurements respectively corresponding to virgin zone only and flushed zone only and a line representing formation porosity values in the absence of the gas.

According to a further aspect there is provided a method of determining a porosity of a formation surrounding a borehole, the method comprising the steps of: injecting a drilling fluid into the formation; obtaining a first porosity measurement and a second porosity measurement, both porosity measurements taken at a first time and at a second time, wherein the first porosity measurement is of a type selected to indicate a different porosity measurement in the presence of a gas as compared to the second porosity measurement, and wherein the first and second porosity measurements are affected approximately proportionally by the gas; obtaining a third porosity measurement and a fourth porosity measurement at substantially the same time that is different from the first and second times and at substantially dissimilar depths-of-investigation to the first and second porosity measurements and with respect to each other; and determining the porosity of the formation using the first, second, third and fourth porosity measurements, for example, by calculating a distance of penetration of the drilling fluid into the formation using the third and fourth porosity measurements; combining the first and second porosity measurements with the calculated distance of penetration to compute measurements respectively corresponding to virgin zone only and flushed zone only; and determining the porosity of the formation from an intersection point between a line connecting two data points representing the computed measurements respectively corresponding to virgin zone only and flushed zone only and a line representing formation porosity values in the absence of the gas.

According to yet a further aspect there is provided a method of determining a porosity of a formation surrounding a borehole, the method comprising the step of: injecting a drilling fluid into the formation; obtaining a first porosity measurement and a second porosity measurement at substantially the same time, wherein the first and second porosity measurements are different types of porosity measurements that provide different porosity measurement values in the presence of a gas having a known characteristic; obtaining a third porosity measurement and a fourth porosity at substantially the same time that is different from the time at which the first and second porosity measurements are obtained and at substantially dissimilar depths-of-investigation to the first and second porosity measurements and with respect to each other; and determining the porosity of the formation using the first, second, third and fourth porosity measurements, for example, by calculating a distance of penetration of the drilling fluid into the formation using the third and fourth porosity measurements; combining the first and second porosity measurements with the calculated distance of penetration to compute measurements respectively corresponding to virgin zone only and flushed zone only; and determining the porosity of the formation from an intersection point between a curve of the known gas characteristic passing through two data points representing the computed measurements respectively corresponding to virgin zone only and flushed zone only and a line representing formation porosity values in the absence of the gas.

According to a further aspect there is provided a downhole tool that is equipped to determine formation porosity using at least one of the aforementioned methods.

BRIEF DESCRIPTION OF DRAWINGS

Embodiments will now be described by way of an example with reference to the accompanying drawings, in which:

FIGS. 3a) and b) show different gas composition, pressure and temperature conditions;

FIG. 4a) shows a deviated point affected by shallow invasion;

FIG. 4b) shows when the invasion and saturation lines are not coplanar;

DETAILED DESCRIPTION

Figure 1A:
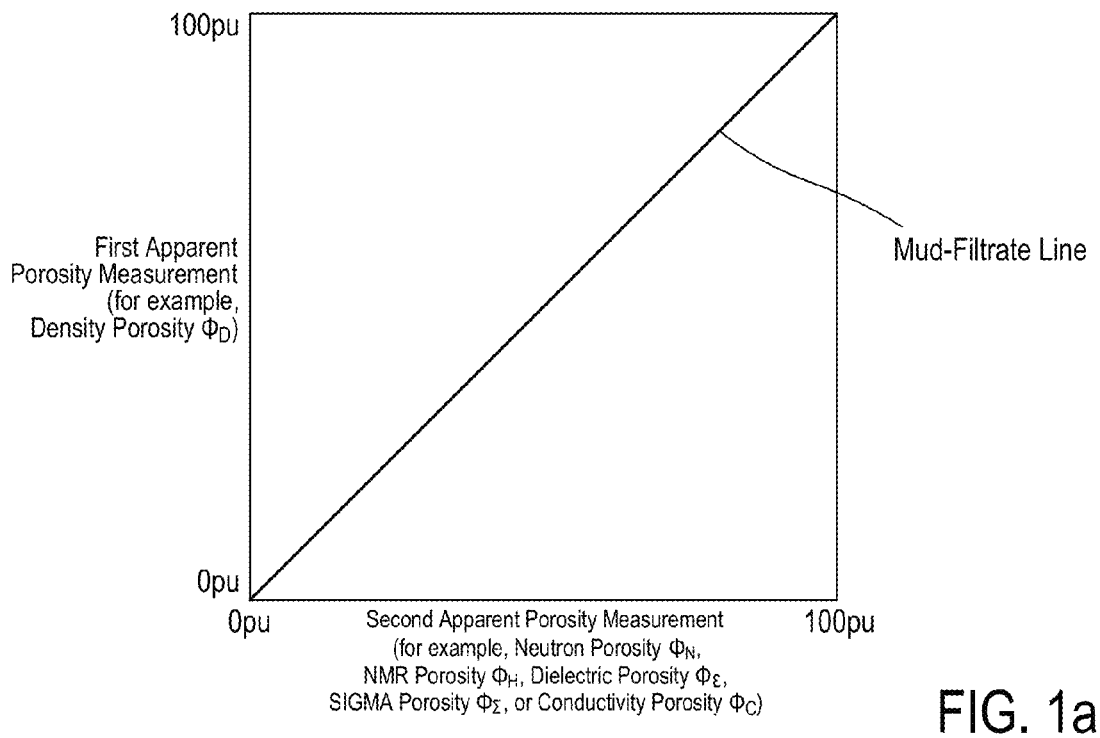
FIG. 1a) shows a bounded 2D plot of first and second apparent porosity measurements assuming the presence of drilling mud filtrate.

Typically, underground log measurements of a formation can take many different forms, for example: Resistivity, Dielectric, NMR (Nuclear Magnetic Resonance), Density, Neutron, Sigma (Thermal Neutron Capture Cross-Section), Photoelectric, Acoustic, Carbon-Oxygen, etc. Such measurements depend on the different sensor and detector types that may be possible, the exact position and location of such sensors and the specific tool design considered.

Once logging measurements have been taken by a downhole logging tool, it is usually possible to express and convert these log measurements into corresponding porosity measurements. In order to carry out such a transformation, or scaling of the different log measurements into corresponding porosity measurements, it is necessary to know i) the type and nature of the rock matrix; and ii) the type of substance(s) present inside the pores of the formation. It is becoming fairly easy to know the type of the formation, for example by Elemental Thermal Neutron Capture Spectroscopy techniques, but it remains difficult to foresee or account for all the substance types possible.

In this case, one resorts to making an a-priori assumption regarding the type of fluid(s) present inside the pores, and uses the expression Apparent Porosity to refer to such derived porosity. For example, by making the assumption that the only substances present inside the pores consist of Irreducible Water (or Bound Water) and drilling mud filtrate (liquid), it is ensured that all the Apparent Porosity's computed from all the different measurements available, results in the same value whenever the assumption holds true, and this same value corresponds to the correct porosity. If however, the assumption does not hold true, and a different substance is present inside the pores besides Irreducible Water and drilling mud filtrate, then it is only natural to expect some of the Apparent Porosity's computed to differ from each other, depending on a case-by-case basis on the logging measurements considered, and on the nature of the intruding substance(s) versus drilling mud filtrate. Accordingly, the Apparent Porosity measurements need to be corrected in some manner to account for the presence of a different type of substance in the formation, such as gas, in order to retrieve the correct porosity. Indeed, not only does gas usually affect a range of log measurements, but so do lighter fluids in general like light oil. Thus, it should be appreciated that the indication of the presence of gas, might also be extended to mean to include light oil.

Thus using the assumption that the only substances present inside the pores of the formation are Irreducible Water and drilling mud filtrate, it is possible to obtain various apparent porosity measurements of the formation. More specifically, if for example the type of log measurement being converted into porosity, is a density measurement, then such porosity transformation may be more accurately referred to as the Apparent Density Porosity measurement.

Figure 1B:
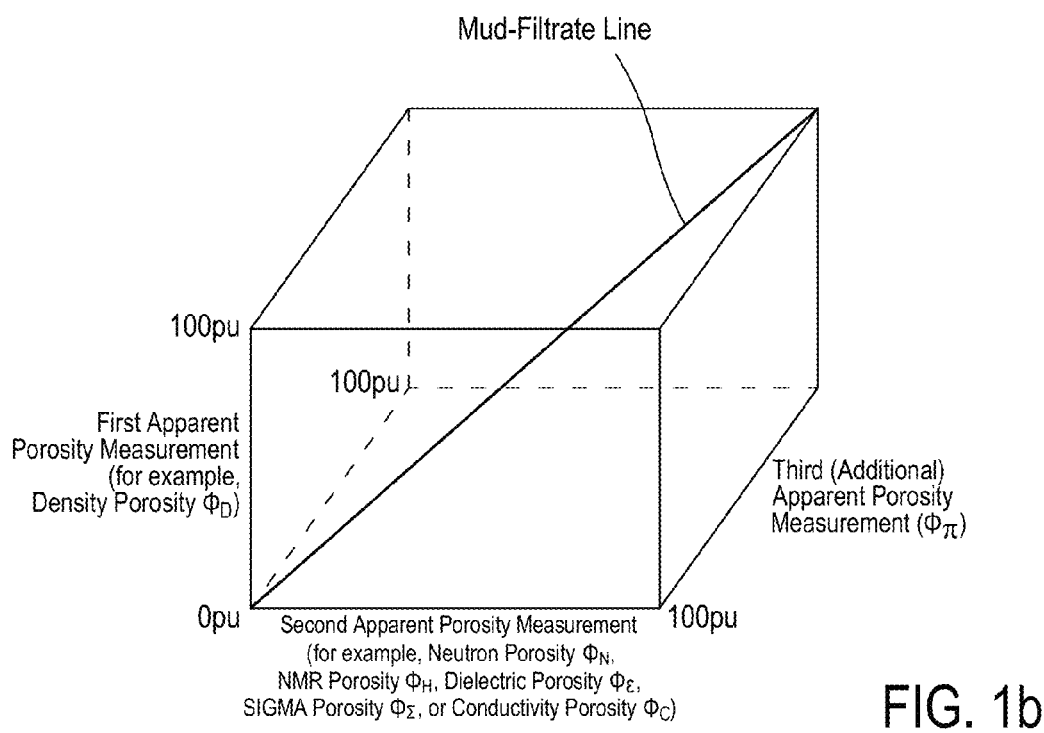
FIG. 1b) shows a bounded 3D plot of first, second and third apparent porosity measurements assuming the presence of drilling mud filtrate.

The so-called gas saturation is the percentage of the pore space filled with gas and it follows that the higher the gas saturation the more each type of various Apparent Porosity measurements will deviate with respect to each other. Specifically, in the case where only two different Apparent Porosity measurement types are being considered and compared, the relationship between these two different types of measurements will consist of a straight line having a gradient of 1 as shown in FIG. 1a). That is, in the situation where only Irreducible Water and drilling mud filtrate are present inside the pores of the underground formation. FIG. 1a) shows a bounded plot having a y-axis showing a first Apparent Porosity measurement, which is an Apparent Density Porosity type of measurement; and an x-axis showing a second Apparent Porosity measurement. The second Apparent Porosity measurement could be one of a plurality of different Apparent Porosity measurement types such as: Apparent Neutron Porosity, Apparent NMR Porosity, Apparent Dielectric Porosity, Apparent Sigma Porosity or Apparent Conductivity Porosity. In the situation where only Irreducible Water and drilling mud filtrate are present inside the pores of the underground formation, these first and second measurements when cross-plotted together fall on a straight line described as the Zero-Gas Line or the Mud-Filtrate Line and with a gradient of 1, which means the first and second measurements indicate the same apparent porosity value, which is also the correct porosity. FIG. 1b) shows a bounded plot similar to FIG. 1a), but having an additional z-axis showing a third Apparent Porosity measurement.

If instead the first and second measurements deviate from each other, corresponding to a point on FIG. 1a) (or FIG. 1b) if a third measurement is also available) that does not cross-plot on the Mud-Filtrate Line, then this would indicate that the assumption that only Irreducible Water and drilling mud filtrate are present inside the pores has been violated. This, in turn, demonstrates the presence of at least one intruding substance, namely gas (or light oil) as might be the case. Specifically, this would occur since the first measurement would be of a type that measures a different (higher or lower) Apparent Porosity value as compared to the second measurement.

Figure 2A:
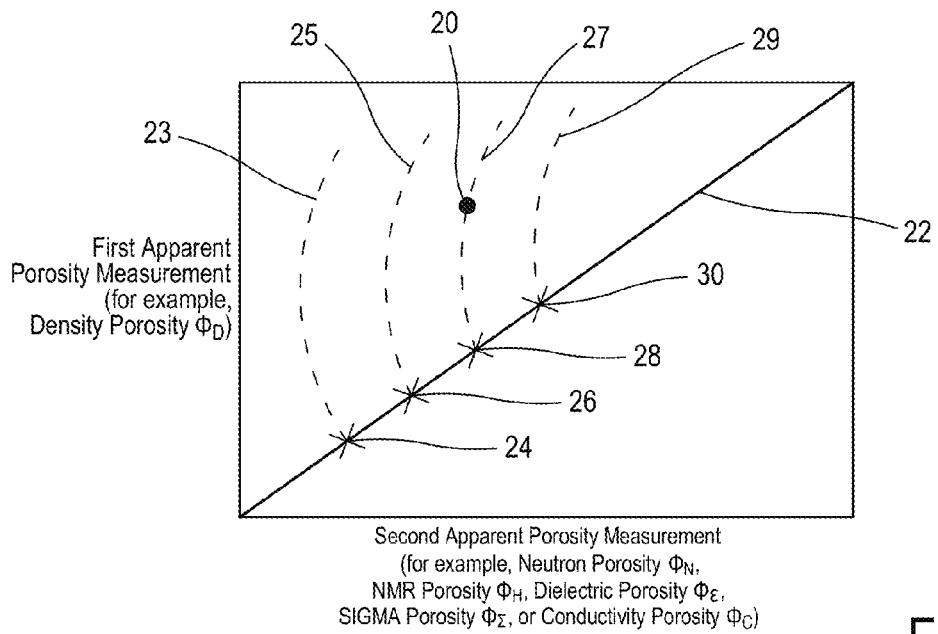
FIGS. 2a) and b) show a deviated point indicating the presence of gas.

FIG. 2a) is an example of a bounded plot similar to FIG. 1a), showing a deviated point 20 indicating the presence of gas. When such a deviation takes place, as a result of an Apparent Porosity measurement of a first type being higher than another Apparent Porosity measurement of a second type, then this complicates the estimation of correct porosity, because one needs an appropriate technique to project the deviated point 20 onto the corresponding correct porosity point of the Mud-Filtrate Line 22.

Figure 2B:
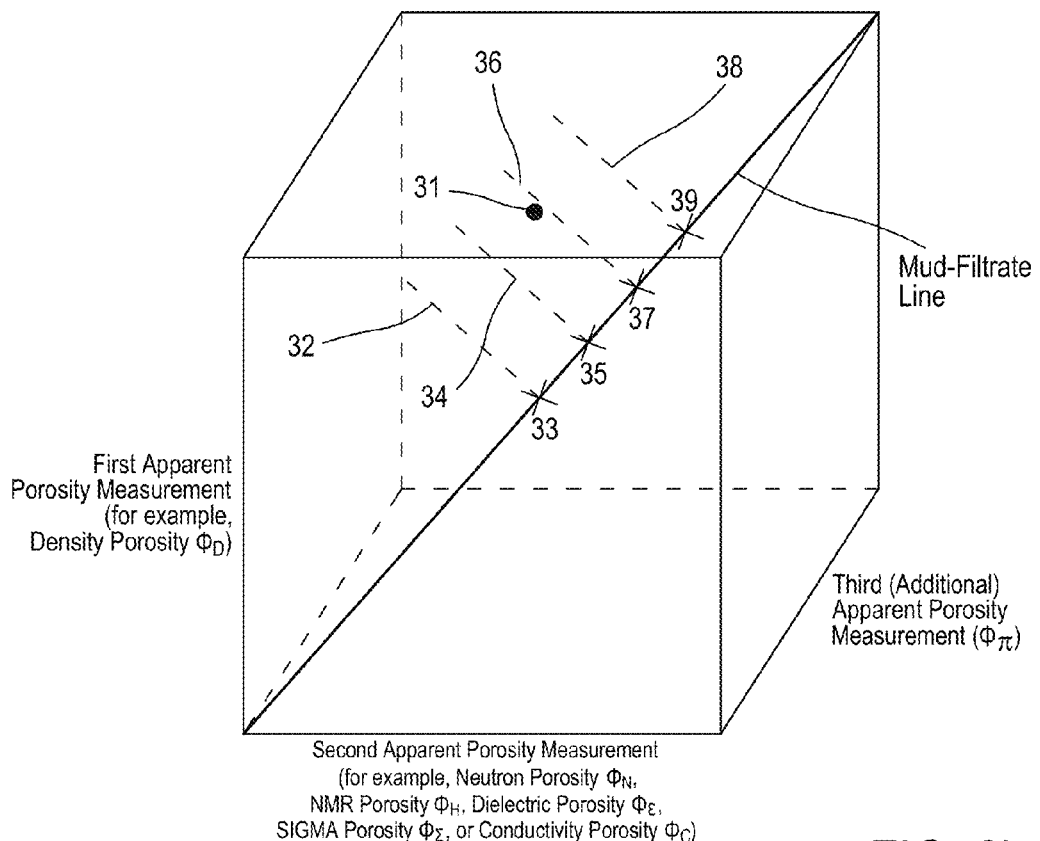

FIG. 2b) is an example of a bounded plot similar to FIG. 2a), but having an additional z-axis showing a third Apparent Porosity measurement (as shown in FIG. 1b)) and showing a deviated point 31 indicating the presence of gas.

There are a plurality of embodiments that allow the correct porosity (projection onto line 22) to be determined.

According to one embodiment it is possible to determine the correct porosity, if predetermined or a priori gas characteristic data is available. For example, FIG. 2a) shows a plurality of gas characteristic curves (so-called Saturation Lines, obtained by varying gas saturation) 23, 25, 27 and 29 intersecting with the Mud-Filtrate Line 22 points 24, 26, 28 and 30. Excluding any invasion effects for now, if the actual characteristic(s) of the gas inside the pores of the underground formation is known, then the gas characteristic Saturation Line which overlaps the deviated point also projects the correct porosity at the point at which the Saturation Line goes on to intersect with the Mud-Filtrate Line. Specifically, in the example of FIG. 2a), the gas characteristic Saturation Line 27 overlaps with the deviated point 20. Thus the correct porosity is obtained by following the Saturation Line 27 until it intersects with the Mud-Filtrate Line 22 at point 28.

It should be appreciated that light oil as well as gas could cause the deviation. Moreover, gasses of different composition, pressure and temperature may also affect the magnitude of the deviation. Thus, to be even more accurate, the gas characteristics should also preferably take into account the so-called PVT (Pressure Volume Temperature) response diagrams of the gas.

FIG. 3a) shows three types of gas each having a different composition and as such each has its own gas characteristic Saturation Line. The three gasses are carbon dioxide $CO_2$, hydrogen sulfide $H_2S$ and methane $CH_4$. As compared to $CH_4$ which has 4 hydrogen atoms per molecule and shows the lowest molecular weight, $H_2S$ has only 2 hydrogen atoms per molecule and a higher molecular weight, and $CO_2$ has no hydrogen atoms at all and has the highest molecular weight. Therefore all other things being equal, and as compared to $CH_4$ at the same pressure and temperature conditions, $H_2S$ would result instead in lower Apparent Neutron Porosity and Apparent Density Porosity measurements, and $CO_2$ would result instead in the lowest Apparent Neutron Porosity and Apparent Density Porosity measurements of all three. So taking into account the example shown in FIG. 2a), these three different gas types would each come with their own gas characteristic Saturation Lines.

FIG. 3b) shows the same three gases being affected by pressure and temperature variations. Thus at a particular pressure and temperature, each of the three gasses has its own hydrogen index and density approximately arranged as indicated in FIG. 3a). However, as the pressure is dropped for example while the temperature remains constant, or as the temperature is increased while the pressure remains constant, the properties of the three gasses all tend towards the origin of the plot which indicates vaccum (the Void Point), albeit along their own lines. Thus, it can be seen how pressure and temperature conditions (together with PVT diagrams) also affect the gas characteristic Saturation Lines.

Thus, the gas characteristic Saturation Line is going to change depending on both the type of gas and the pressure and temperature conditions. Whether or not the substances present inside the pores of the underground formation comprise additional substance(s) that cause deviation, such as a gas of a particular composition type or under particular pressure and temperature conditions; provided the characteristic response of the additional substance or gas is known then the correct porosity can be determined. It should be appreciated that the gas characteristic Saturation Lines can be obtained either by a priori modelling in the lab or by measurements taken downhole in situ. Thus, a logging tool equipped with the processor and measurement sensors may obtain said gas characteristic Saturation Lines along with the first and second porosity measurements.

According to another embodiment there is provided a way to take into account shallow incomplete mud-filtrate invasion, for example as typically experienced in LWD applications. This invasion is caused by the hydrostatic pressure of the drilling mud being higher than the pressure of the fluids present inside the pores of the underground formations, which is desired to prevent the formation fluids from flowing into the drilled well and reaching the surface in an uncontrolled fashion, resulting in so-called blowouts and other catastrophic events. This pressure differential between the drilling mud and the formation fluids results in drilling mud filtrate being pushed and squeezed into the formation and displacing the original formation fluids present inside the pores, resulting in a so-called invasion front that penetrates into the formation as a function of time. It is this invasion front which defines the boundary between the so-called Virgin Zone (vz) and the Flushed Zone (fz) of the formation. The flushed zone refers to the volume of the formation that has been penetrated and occupied by the drilling mud filtrate, whereas the virgin zone refers to the volume of the formation that has not been reached and altered by the drilling mud filtrate.

The invasion adds much complexity, particularly in LWD applications where the invasion has not settled (unlike for WL) and therefore is likely to affect measurements differently and in a time-dependent fashion, particularly where the measurements have a different radial depth-of-investigation into the formation. This is because, for example a first measurement having a shallow depth-of-investigation lying within the flushed zone will be wholly affected by invasion, whereas a second measurement having a depth-of-investigation that extends into the virgin zone will only be partly affected by the invasion.

It follows that corresponding Apparent Porosity measurements may deviate from each other, not only because the assumptions behind such Apparent Porosity transformations are not met, such as due to the presence of gas inside the pores of the underground formation as was discussed earlier, but also because the measurements will be affected differently by drilling mud filtrate invasion, which adds complexity to the task of extracting and estimating correct porosity from such measurements. Moreover it will be appreciated that over time the invasion front will penetrate and progress deeper into the formation, and as such a first point (obtained by first and second measurements) at a first time, could well be deviated and different from a second point (obtained by first and second measurements) at a later time when the invasion might have changed.

FIG. 4a) shows an example of how invasion adds complexity. The Virgin Zone deviated point 40 and the Flushed Zone deviated point 41 both fall on the same gas characteristic Saturation Line, but the shown deviated point 42 does not fall in general on the same gas characteristic Saturation Line. Instead, point 42 falls on a different line (the Invasion Line) joining the Virgin Zone deviated point 40 and the Flushed Zone deviated point 41, and describing how point 42 location may change continuously with the depth-of-invasion depending on the time of the measurement, and taking into account any differences in the depth-of-investigation of the first and second measurements. Moreover, whereas it is trivial that the Virgin Zone deviated point 40 and Flushed Zone deviated point 41 should fall on the same gas characteristic Saturation Line, the exact position of such Virgin Zone and Flushed Zone deviated points on the gas characteristic Saturation Line, can be located just about anywhere on the line. This is because other underground formation properties which are typically unknown or difficult to obtain, such as the so-called effective porosity, control the exact position of the Virgin Zone and Flushed Zone deviated points.

Thus, even if the gas characteristic Saturation Lines are known, it is not possible to know on which Invasion Line exactly the deviated point 42 is actually located, or to know which gas characteristic Saturation Line to use to intercept the Mud-Filtrate Line and work out the correct porosity.

FIG. 4*b* is an example similar to FIG. 4*a*, but having an additional z-axis showing a third Apparent Porosity measurement, where the invasion and saturation lines are not coplanar.

Figure 5A:
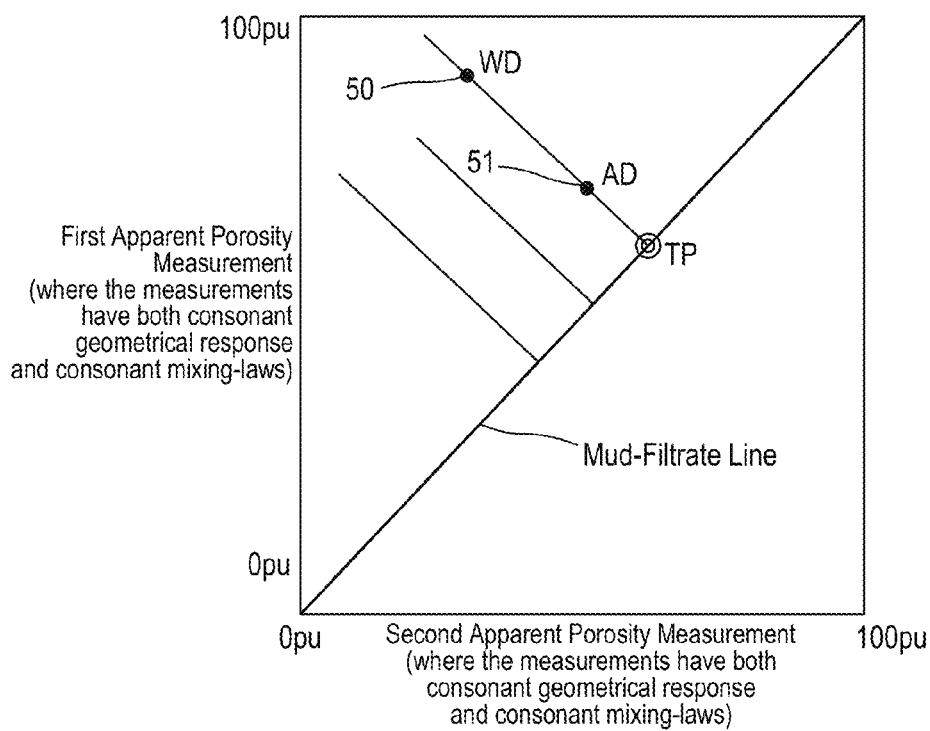
FIG. 5a) shows two deviated points taken at two different times where the invasion and the gas characteristic lines are straight.
Figure 5B:
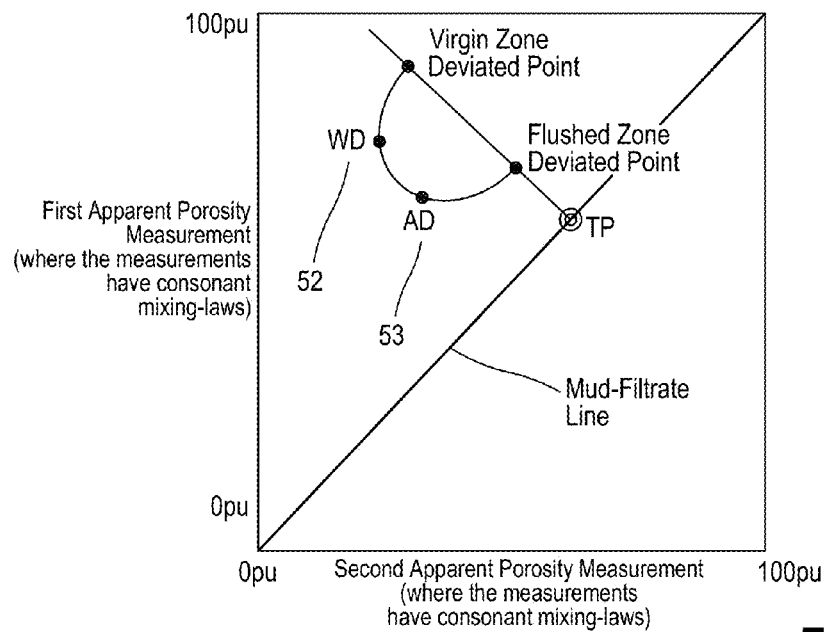
FIG. 5b) shows two deviated points taken at two different times in the general case when two apparent porosity measurements are being considered.
Figure 5C:
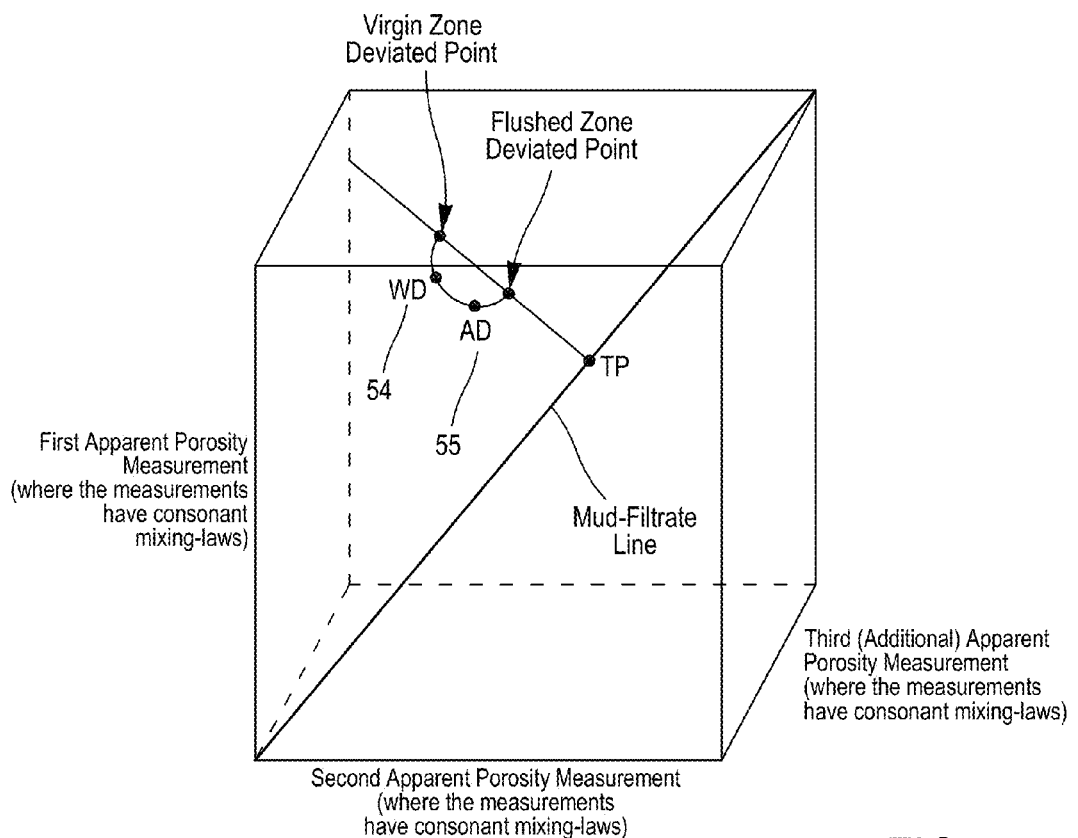
FIG. 5c) shows two deviated points taken at two different times in general when three apparent porosity measurements are being considered.

FIG. 5 shows an example of two deviated points WD and AD (labeled respectively as 50 and 51 in FIG. 5*a*, and as 52 and 53 in FIG. 5*b*, and as 54 and 55 in FIG. 5*c*)), each of which deviates from the zero-gas line indicating the presence of light oil or gas, and which are only different from one another because they are taken at different times. That is, the first point WD is obtained by taking first and second measurements (and a third measurement as the case may be) at a first time while drilling the borehole, whereas the second point AD is obtained by taking the same measurements just at a later time after drilling the borehole.

There are a plurality of embodiments that allow the correct porosity to be determined to take account of invasion.

According to one embodiment, invasion is accounted for in that the first and second measurements are taken to have a consonant geometrical response, and consonant mixing-laws. Geometrical consonance means that the measurements have similar radial response J-functions, which more simply means that the first and second measurements have substantially the same depth-of-investigation into the formation. Mixing-Laws consonance means that the measurements are affected proportionally by the gas. In relation to FIG. 4*a*, the geometrical consonance of the first and second measurements means that the Invasion Lines joining the deviated Virgin Zone point 40 and the deviated Flushed Zone point 41 become straight lines, and the mixing-Laws consonance means that the gas characteristic Saturation Lines become straight. So both Invasion Lines and gas characteristic Saturation Lines would include precisely overlaying and identical straight lines such as shown in FIG. 5*a*, allowing a more straightforward and more accurate projection of any deviated point onto the Mud-Filtrate Line. Thus the correct porosity is determined from point TP in FIG. 5*a*.

In the Appendix there is explained a mathematical derivation of equation 1 (below), in relation to the concept of geometrical consonance, which is also explained with reference to FIG. 6. Specifically, the term on the left-hand side of equation 1 represents the position of a deviated point as a function of time due to invasion front progressing into the formation (i.e., the Invasion Line) over time. Whereas the first term on the right-hand side of equation 1 corresponds to a linear relationship, the second term instead is responsible for the curvature of the Invasion Line.

Thus, the effect of the second term can be cancelled if we can make the factor $J_N(d_i(t))-J_D(d_i(t))$ approximately zero. This can be done by selecting the first and second types of measurements to have substantially the same radial J-function response characteristics (i.e., to have geometrical consonance), in which case the Invasion Lines become straight lines, because only the first linear term on the right-hand side of equation 1 remains. At least one example for achieving such geometrical consonance is to consider the Neutron-Gamma type of Density measurement in conjunction with a Neutron Porosity measurement.

$$\begin{pmatrix} N_{log}(d_i(t)) \\ D_{log}(d_i(t)) \end{pmatrix} - \begin{pmatrix} N_{log}^{[vz]} \\ D_{log}^{[vz]} \end{pmatrix} = \qquad \text{Equation 1}$$

$$\begin{pmatrix} N_{log}^{[fz]} - N_{log}^{[vz]} \\ D_{log}^{[fz]} - D_{log}^{[vz]} \end{pmatrix} \cdot \frac{J_N(d_i(t)) + J_D(d_i(t))}{2} +$$

$$\begin{pmatrix} N_{log}^{[fz]} - N_{log}^{[vz]} - \\ (D_{log}^{[fz]} - D_{log}^{[vz]}) \end{pmatrix} \cdot \frac{J_N(d_i(t)) - J_D(d_i(t))}{2}$$

Thus, by selecting the first and second measurements to have substantially the same depth-of-investigation, both measurements will always be affected by invasion in the same manner, irrespective of the depth-of-invasion or the time of measurement. Thus, the problem posed by non-linear invasion effects is overcome. The radial J-function describes how a particular measurement's response varies and changes continuously as a function of the depth-of-invasion, taking-up a value corresponding to the Virgin Zone's measurement response when the depth-of-invasion is close to zero, at very early times, and changing continuously as the depth-of-invasion progresses deeper into the formation over time, until it takes-up a value corresponding to the Flushed Zone's measurement response after the depth-of-invasion has significantly exceeded the depth-of-investigation of the measurement, typically after a couple of days. Thus, the J-function usually takes-up values between 0% and 100%, and is defined as the relative contributions of the Flushed Zone (contributing J) and the Virgin Zone (contributing (100%–J)) to a particular measurement. For example, often these J-functions are known or have been modeled or pre-calibrated and characterized, as is typically done for example for Neutron and Density measurements.

In the Appendix there is also explained a mathematical derivation of equation 2 (below), in relation to the concept of mixing-Laws consonance, which also refers to FIG. 6. Specifically excluding any invasion effects, the term on the left-hand side of equation 2 describes a deviated point location as a function of gas saturation only. Whereas the first term on the right-hand side of equation 2 corresponds to a linear relationship, the second term instead is responsible for the curvature of the gas characteristic Saturation Lines. Thus, the effect of the second term can be cancelled if we can make the factor $S_g^{[N]}(\phi, S_g) - S_g^{[D]}(\phi, S_g)$ approximately zero. This can be done by selecting the first and second types of measurements, to be affected approximately proportionally by gas presence inside the pores, in which case the gas characteristic Saturation Lines become straight lines, because only the first linear term on the right-hand side of equation 2 remains. An example for achieving such mixing-Laws consonance, is to consider the Neutron-Gamma type of Density measurement in conjunction with Neutron Porosity measurements.

$$\left(\begin{matrix}N(\Phi, S_g)\\ D(\Phi, S_g)\end{matrix}\right) - \left(\begin{matrix}N(\Phi, 0)\\ D(\Phi, 0)\end{matrix}\right) =$$

$$\left(\begin{matrix}N(\Phi, 1) - N(\Phi, 0)\\ D(\Phi, 1) - D(\Phi, 0)\end{matrix}\right) \cdot \frac{S_g^{[N]}(\Phi, S_g) + S_g^{[D]}(\Phi, S_g)}{2} +$$

$$\left(\begin{matrix}N(\Phi, 1) - N(\Phi, 0) -\\ (D(\Phi, 1) - D(\Phi, 0))\end{matrix}\right) \cdot \frac{S_g^{[N]}(\Phi, S_g) - S_g^{[D]}(\Phi, S_g)}{2}$$

Equation 2

Thus, by selecting the first and second measurements to be affected approximately proportionally by gas presence inside the pores, the gas characteristic Saturation Lines become straight lines, which are easier to model, handle, and project onto the Mud-Filtrate Line.

Moreover, by selecting the first and second measurements to simultaneously have substantially the same depth-of-investigation, and to be affected approximately proportionally by gas presence inside the pores, both the Invasion Lines and the gas characteristic Saturations lines become one and the same straight line, and one overcomes the problem posed by not knowing how to project a starting deviated point located on an Invasion Line, onto the otherwise unknown corresponding gas characteristic Saturation Line. Moreover, because a straight line is uniquely determined by any two points located on that straight line, it becomes possible to define the gas characteristic Saturation Lines in-situ, simply by obtaining two deviated points at two different times, such as shown in FIG. 5a. This eliminates the painstaking requirement to have gas composition and PVT diagrams available or gas characteristic Saturation Lines modelled a priori.

This embodiment is therefore able to determine the correct porosity which takes into account both unknown shallow drilling mud filtrate invasion, and unknown fluid type or substance present inside the pores of the underground formation, such as gas. This is done by taking the first and second measurements at about the same radial depth-of-investigation and with approximately consonant mixing-laws, which when combined with making these measurements in a time-lapse fashion (i.e., at different times) allows the correct porosity to be determined as shown in FIG. 5a).

According to another embodiment, the correct porosity to be determined can also take into account unknown shallow drilling mud filtrate invasion, but does not take into account unknown fluid type or substance present inside the pores of the underground formation. Instead, it is assumed that the fluid type or substance present inside the pores of the underground formation has been predetermined and characterized, by taking the first and second measurements at about the same radial depth-of-investigation, and with approximately consonant mixing-laws, which when combined with making these measurements only once (i.e., at only one time) allows the correct porosity to be determined as shown in FIG. 5a).

According to yet a further embodiment, invasion is first accounted for by obtaining a measurement of the depth-of-invasion (i.e., distance of penetration of the invasion front into the formation). For example, this can be obtained using tools or instruments equipped with so-called array sensors, and designed to acquire the same kind of measurement at different depths-of-investigation. This results in multiple synchronous but different readings of the same measurement, due to invasion affecting these multiple measurements differently, which can be processed to back-out the effects of invasion. This is for example typically and routinely the case for Conductivity or Resistivity measurements, and more recently for Sigma measurements. For example, another way to obtain the depth-of-invasion may be to send ultrasonic waves into the formation, and measuring the two-way reflection time of such waves against the step invasion front boundary (i.e., the time it takes for the ultrasonic pulse to bounce against the step invasion front, and return to the ultrasonic sensor).

This embodiment determines the correct porosity which takes into account the obtained or predetermined depth-of-invasion measurement, and takes into account an unknown fluid type or substance present inside the pores of the underground formation. This is done by taking the first and second measurements with approximately consonant mixing-laws, which when combined with making these measurements in a time-lapse fashion (i.e., at different times), allows the application of the method described in U.S. Patent Application Publication No. US 2009/0177403, the entirety of which is herein incorporated by reference, to compute the first and second measurements corresponding to the Virgin Zone only (as if the formation had been freshly drilled and no invasion had taken place at all) and to the Flushed Zone only (as if the formation had been drilled days ago and the invasion front had progressed indefinitely), which in turn allows the correct porosity to be determined as shown in FIG. 5b). This is possible, because as stated earlier, the deviated Virgin Zone and Flushed Zone points are situated on the same gas characteristic Saturation Line, and together with the mixing-laws consonance of the first and second measurements. The straight line passing through these two points is simply the gas characteristic Saturation Line as well.

According to a further embodiment, one can determine the correct porosity which takes into account the obtained or predetermined depth-of-invasion measurement, but does not take into account an unknown fluid type or substance present inside the pores of the underground formation. Instead the fluid type or substance present inside the pores of the underground formation has been predetermined and characterized. By taking the first and second measurements only once (i.e., at only one time), which when combined with taking at least a third measurement with dissimilar depth-of-investigation at the same time, allows the correct porosity to be determined as shown in FIG. 4b). This is because the obtained or predetermined depth-of-invasion, together with the predetermined gas characteristics, and combined with measurements of dissimilar depth-of-investigation, make it possible again to compute the first and second and additional measurements corresponding to the Virgin Zone only (as if the formation had been freshly drilled and no invasion had taken place at all) and to the Flushed Zone only (as if the formation had been drilled days ago and the invasion front had progressed indefinitely). This may be expressed graphically, where the Invasion Lines and gas characteristic Saturation Lines are not coplanar (i.e., not located inside the same plane) as shown in FIG. 4b), which makes it possible to distinguish the Invasion Lines from the gas characteristics Saturation Lines (unlike the situation described by FIG. 4a)). This in turn allows the correct porosity to be determined again as shown in FIG. 4b), using any of the Virgin Zone or Flushed Zone deviated points, because as stated earlier the deviated Virgin Zone and Flushed Zone points are situated on the same gas characteristic Saturation Line. In this embodiment it is assumed that the gas characteristic Saturation Lines (which are curved and not necessarily straightlines in this situation) have been predetermined.

Thus, with the measurement of the radial depth-of-invasion, together with predetermined gas characteristics, and at least one additional measurement with dissimilar depth-of-investigation, it is possible to identify exactly which Invasion Line overlaps with the deviated point, and after that the exact gas characteristic Saturation Line that overlaps with the Virgin Zone and Flushed Zone deviated points corresponding to such Invasion Line. The correct porosity is then determined from where the gas characteristic Saturation Line intersects with the Mud-Filtrate Line.

For this embodiment, equation 3 represents the condition that should be satisfied by a third measurement $\pi$ additional to the first measurement M and the second measurement m, assuming all measurements are linear for the sake of simplifying this equation, in order to qualify as an additional measurement with dissimilar depth-of-investigation.

$$J_\pi(d_i) \cdot (\Delta\pi_G - \Delta\pi_g) \neq \quad \text{Equation 3}$$

$$J_M(d_i) \cdot (\Delta M_G - \Delta M_g) \cdot \frac{\begin{vmatrix} \Delta\pi_G & \Delta m_G \\ \Delta\pi_g & \Delta m_g \end{vmatrix}}{\begin{vmatrix} \Delta M_G & \Delta m_G \\ \Delta M_g & \Delta m_g \end{vmatrix}} +$$

$$J_m(d_i) \cdot (\Delta m_G - \Delta m_g) \cdot \frac{\begin{vmatrix} \Delta M_G & \Delta\pi_G \\ \Delta M_g & \Delta\pi_g \end{vmatrix}}{\begin{vmatrix} \Delta M_G & \Delta m_G \\ \Delta M_g & \Delta m_g \end{vmatrix}}$$

where $d_i$ refers to the expected range of depths-of-invasion, J's refers to the various measurements radial J-functions, and explanation of other symbols used in this equation 3 cab be found in the Appendix.

Put simply, according to equation 3, a third measurement $\pi$ should be selected to have non-consonant geometrical response with respect to the first measurement M and the second measurement m. That is, although $\pi$ can be of the same type of measurement as either M or m; it should be selected to have a significantly different radial depth-of-investigation into the formation. In any event, this additional measurement ensures that the Invasion Lines of FIG. 4b) lie well outside of the surface generated by the various gas characteristic Saturation Lines, which helps to identify which Invasion Line the deviated point belongs to, and solve uniquely for the unknown corresponding Virgin Zone and Flushed Zone deviated points.

According to yet another embodiment, invasion is accounted for by additional measurements. Specifically, this embodiment determines the correct porosity which takes into account both unknown shallow drilling mud filtrate invasion and an unknown fluid type or substance present inside the pores of the underground formation. This is performed by taking the first and second measurements with approximately consonant mixing-laws and at least two additional measurements with dissimilar depth-of-investigation, which when combined with making these measurements in a time-lapse fashion (i.e., at different times), make it possible to determine and solve for the depth-of-invasion. Thus, this allows for example, the existing techniques described in the U.S. Patent Application Publication No. US 2009/0177403 to compute the first and second and additional measurements corresponding to the Virgin Zone only (as if the formation had been freshly drilled and no invasion had taken place at all) and to the Flushed Zone only (as if the formation had been drilled days ago and the invasion front had progressed indefinitely). Again the correct porosity is determined, like in FIG. 5c), where FIG. 5c) is considered to represent four-dimensional space in a generic fashion, wherein the four axes or dimensions correspond to each of the four Apparent Porosity measurements obtained. This is possible, because as discussed earlier, the deviated Virgin Zone and Flushed Zone points are situated on the same gas characteristic Saturation Line, and together with the mixing-laws consonance of the first and second measurements, the straight line passing through these two points is simply the gas characteristic Saturation Line as well.

For this embodiment, equation 4 represents the condition that should be satisfied by a third measurement $\pi$ and a fourth measurement P additional to the first measurement M and the second measurement m, assuming all measurements are linear for the sake of simplifying this equation, in order to qualify as additional measurements with dissimilar depth-of-investigation:

$$\text{Equation 4}$$

$$\left( J_\pi(d_i) \cdot \Delta\pi_G - \right.$$

$$\left( J_M(d_i) \cdot \Delta M_G \cdot \frac{\begin{vmatrix} \Delta\pi_G & \Delta m_G \\ \Delta\pi_g & \Delta m_g \end{vmatrix}}{\begin{vmatrix} \Delta M_G & \Delta m_G \\ \Delta M_g & \Delta m_g \end{vmatrix}} + J_m(d_i) \cdot \Delta m_G \cdot \frac{\begin{vmatrix} \Delta M_G & \Delta\pi_G \\ \Delta M_g & \Delta\pi_g \end{vmatrix}}{\begin{vmatrix} \Delta M_G & \Delta m_G \\ \Delta M_g & \Delta m_g \end{vmatrix}} \right) \times$$

$$\left( J_P(d_i) \cdot \Delta P_g - \left( J_M(d_i) \cdot \Delta M_g \cdot \frac{\begin{vmatrix} \Delta P_G & \Delta m_G \\ \Delta P_g & \Delta m_g \end{vmatrix}}{\begin{vmatrix} \Delta M_G & \Delta m_G \\ \Delta M_g & \Delta m_g \end{vmatrix}} + \right. \right.$$

$$\left. \left. J_m(d_i) \cdot \Delta m_g \cdot \frac{\begin{vmatrix} \Delta M_G & \Delta P_G \\ \Delta M_g & \Delta P_g \end{vmatrix}}{\begin{vmatrix} \Delta M_G & \Delta m_G \\ \Delta M_g & \Delta m_g \end{vmatrix}} \right) \right) \neq$$

$$\left( J_\pi(d_i) \cdot \Delta\pi_g - \left( J_M(d_i) \cdot \Delta M_g \cdot \frac{\begin{vmatrix} \Delta\pi_G & \Delta m_G \\ \Delta\pi_g & \Delta m_g \end{vmatrix}}{\begin{vmatrix} \Delta M_G & \Delta m_G \\ \Delta M_g & \Delta m_g \end{vmatrix}} + \right. \right.$$

$$\left. \left. J_m(d_i) \cdot \Delta m_g \cdot \frac{\begin{vmatrix} \Delta M_G & \Delta\pi_G \\ \Delta M_g & \Delta\pi_g \end{vmatrix}}{\begin{vmatrix} \Delta M_G & \Delta m_G \\ \Delta M_g & \Delta m_g \end{vmatrix}} \right) \right) \times \left( J_P(d_i) \cdot \Delta P_G - \right.$$

$$\left. \left( J_M(d_i) \cdot \Delta M_G \cdot \frac{\begin{vmatrix} \Delta P_G & \Delta m_G \\ \Delta P_g & \Delta m_g \end{vmatrix}}{\begin{vmatrix} \Delta M_G & \Delta m_G \\ \Delta M_g & \Delta m_g \end{vmatrix}} + J_m(d_i) \cdot \Delta m_G \cdot \frac{\begin{vmatrix} \Delta M_G & \Delta P_G \\ \Delta M_g & \Delta P_g \end{vmatrix}}{\begin{vmatrix} \Delta M_G & \Delta m_G \\ \Delta M_g & \Delta m_g \end{vmatrix}} \right) \right)$$

where $d_i$ refers to the expected range of depths-of-invasion, J's refers to the various measurements radial J-functions, and explanation of other symbols used in this equation 4 can be found in the Appendix.

Put simply, according to equation 4, a third measurement $\pi$ and a fourth measurement P should be selected to have non-consonant geometrical response with respect to the first measurement M and the second measurement m, and with respect to each other. That is, although $\pi$ and P can be of the same type of measurement as either M or m; the additional measurements π and P should be selected to have a significantly different radial depth-of-investigation into the formation. In any event, these additional measurements ensure that the Invasion Lines of FIG. 5c) (which are considered to represent four-dimensional space), lie well outside of the surface generated by the various gas characteristic Saturation Lines, which helps to know which Invasion Line both WD and AD deviated points belong to simultaneously, to make it possible to solve for the unknown depth-of-invasion, and solve uniquely for the unknown corresponding Virgin Zone and Flushed Zone deviated points.

According to yet another embodiment, invasion is also accounted for by additional measurements. Specifically, this embodiment determines the correct porosity which takes into account an unknown shallow drilling mud filtrate invasion, but does not take into account an unknown fluid type or substance present inside the pores of the underground formation, and provided instead that the fluid type or substance present inside the pores of the underground formation has been predetermined and characterized, by taking the first and second measurements only once (i.e., at only one time), which when combined with taking at least a third measurement and a fourth measurement with dissimilar depths-of-investigation at the same time, allows the correct porosity to be determined as shown in FIG. 5c) (where FIG. 5c) is considered to represent four-dimensional space in a generic fashion, whereas the four axes or dimensions correspond to each of the four Apparent Porosity measurements obtained). This is because all the measurements, combined with the predetermined gas characteristics, make it possible to determine and solve for the depth-of-invasion, as well as to determine and compute the first and second and additional measurements corresponding to the Virgin Zone only (as if the formation had been freshly drilled and no invasion had taken place at all) and to the Flushed Zone only (as if the formation had been drilled days ago and the invasion front had progressed indefinitely). This in turn allows the correct porosity to be determined again as shown in FIG. 5c), using any of the Virgin Zone or Flushed Zone deviated points, because as stated earlier the deviated Virgin Zone and Flushed Zone points are situated on the same gas characteristic Saturation Line, and it is assumed that the gas characteristic Saturation Lines (which are curved and not necessarily straightlines in this situation) have been predetermined.

For this embodiment, the same equation 4 represents the condition that should be satisfied by a third measurement Tr and a fourth measurement P additional to the first measurement M and the second measurement m, assuming all measurements are linear for the sake of simplifying this equation, in order to qualify as additional measurements with dissimilar depth-of-investigation. And in any event, equation 4 helps to solve uniquely for the unknown depth-of-invasion, and solve for the unknown Virgin Zone and Flushed Zone deviated points.

Some of the steps included in some of the above embodiments, whereby the depth of invasion $d_i$ should sometimes be solved for, by way of a plurality of different measurements types with substantially dissimilar depth(s)-of-investigation, may well generically be termed as "Universal Single-Pass [or Synchroneous] Hybrid Invasion Inversion", in contradistinction to "Conventional Invasion Inversion" techniques, using tools or instruments equipped with "array sensors", and designed to acquire exactly the same kind of measurement at different depths-of-investigation, such as routinely and typically the case for Conductivity or Resistivity measurements, and more recently for Sigma measurements (e.g., the WL "High-Resolution Laterolog Array" tool, known as "HRLA"; the WL "Array Induction Tool", known as the "AIT"; the LWD "Array Resistivity Compensated" tool, known as the "arcVISION" tool; the LWD "geoVISION" resistivity tool; etc), thereby providing the means to back-out the effects of invasion (e.g., because three Conductivity measurements at three different depths-of-investigation can solve for three unknowns including, e.g., the depth-of-invasion, the Conductivity of the Flushed Zone, and the Conductivity of the Virgin Zone). Instead, the "Universal Single-Pass [or Synchroneous] Hybrid Invasion Inversion" techniques described herein, also utilize measurements with different depths-of-investigation, but the techniques are designed to, and can handle various combinations of measurements of different types (in fact, the less geometrically consonant the measurements are, the better).

In some of the described embodiments gas characteristics should be predetermined, which is not always practical and therefore for those embodiments where gas characteristics do not have to be predetermined constitute an advantage in this respect.

To be independent of the gas characteristics, various embodiments are able to determine the correct porosity by resorting instead to measurements with so-called mixing-Laws consonance. Specifically, mixing-Laws consonance means that the first and second measurements are affected proportionally in response to changes in the amount of gas inside the pores of the underground formation. Thus, if the first and second measurements are of a type selected to achieve mixing-Laws consonance, then the corresponding gas characteristic Saturation Lines of FIG. 2a), become straight lines instead of just curved lines as is generally the case. These straight gas characteristic Saturation Lines make it easier and more accurate to determine the correct porosity independently of the gas characteristics, because any two deviated points that are known to overlap with the same gas characteristic Saturation Line become enough to uniquely determine this straight line, and thus project the deviated points onto the correct porosity on the Mud-Filtrate Line. For example, the deviated Virgin Zone point and the deviated Flushed Zone point can be used to determine this straight gas characteristic Saturation Line; after the deviated Virgin Zone point and the deviated Flushed Zone point have been computed and invasion has been accounted for separately. Or, for example, if the first and second measurements are acquired in a time-lapse fashion (i.e., the first measurement is acquired at an early first time, and the second measurement at a significantly delayed second time), and selected to achieve geometrical consonance; then the deviated point from the first time and the deviated point from the second time, which are located on an Invasion Line which happens also to be a straight line in this situation due to geometrical consonance, can also be used to uniquely determine the straight gas characteristic Saturation Line, and determine the correct porosity (this situation as described in FIG. 5a)).

The two most common first and second LWD measurements used for porosity measurements in the oil and gas logging industry are the Density measurement and the Neutron measurement. In this situation, Apparent Density Porosity logs increase (due to a drop in density), and Apparent Neutron Porosity logs decrease (due to a drop in hydrogen index), when gas is present inside the pores of the underground formation, typically drilled with WBM (Water-Base-Mud) or OBM (Oil-Base-Mud), resulting in the well-known and so-called neutron-density logs crossover effect when logging gas-bearing formations, as opposed to the neutron-density logs just matching and overlaying each other in the absence of gas. The more the gas saturation, the larger the neutron-density logs cross-over effect, and thus logs (i.e., measurements) acquired while drilling (LWD logs) typically exhibit a larger neutron-density crossover effect when compared to their WL log equivalents, which are typically acquired days later. While this may help to better identify the presence of gas inside the pores, it may also become more challenging to estimate the correct porosity.

Figure 7:
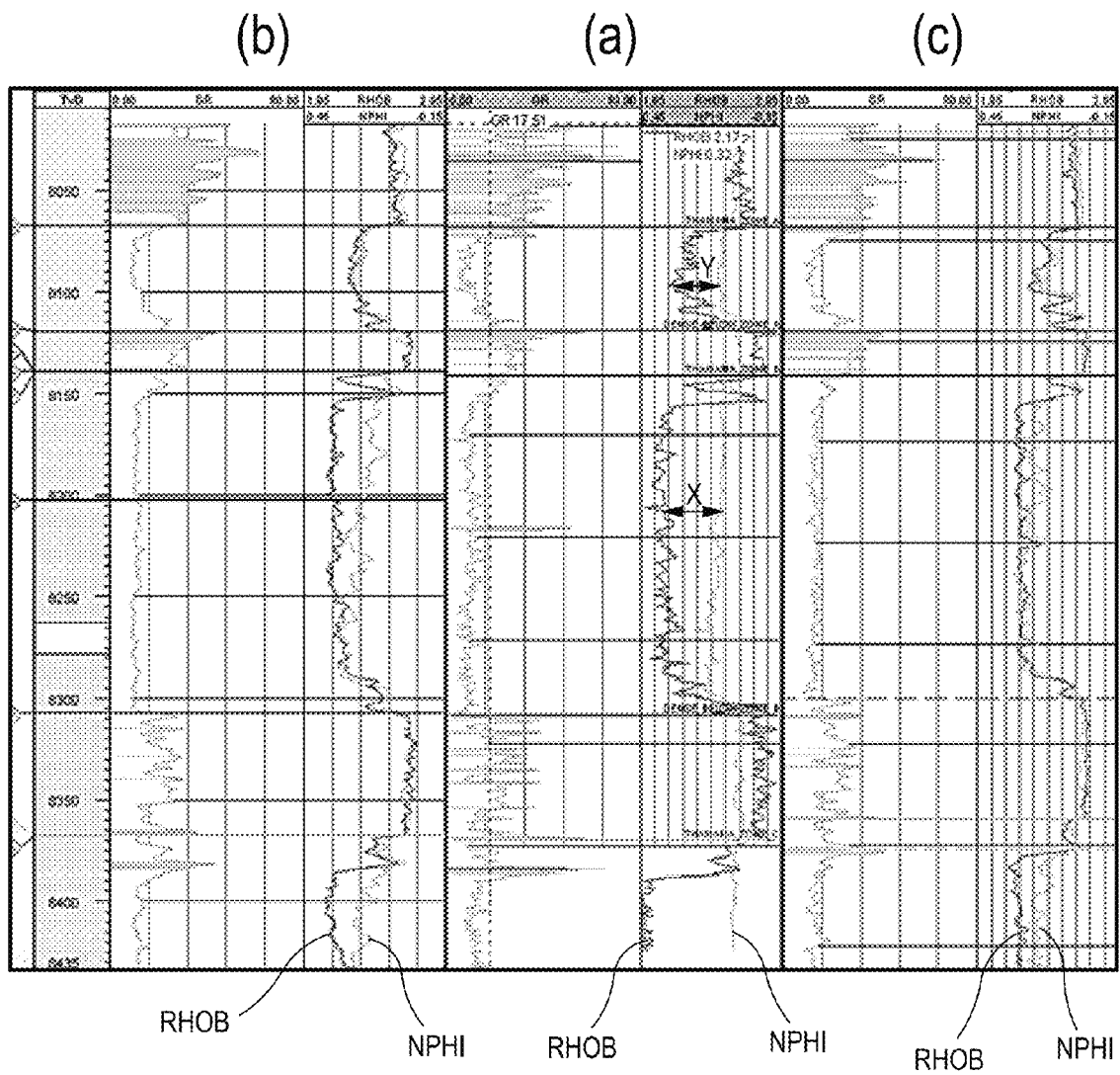
FIG. 7 shows density and neutron log measurement curves.

FIG. 7 shows three sets of logs from three different adjacent wells. The middle log a) shows LWD measurements made during the drilling of one well, and the logs b) and c) on either side show WL measurements made on the other offset wells after drilling. The Density log (RHOB) and the Neutron log (NPHI) curves have reversed scales, with the scales chosen to ensure the two logs overlay each other in the absence of gas, and assuming the rock matrix is Calcite (limestone): RHOB increases from left to right, and NPHI increases from right to left. With this arrangement, the crossover effect can be seen as a large separation between the RHOB and NPHI log curves (see X, Y). As can be seen, this is more pronounced in the LWD while drilling measurements before significant invasion has taken place, than in the WL measurements after drilling when invasion is well-established.

Indeed plot c) on the right-hand side for example, is a WL plot with well-established invasion that displaced almost all the gas from the pores, and barely left behind any gas in the Flushed Zone, which resulted in very little separation between the Density and Neutron log measurements. In such a case, the correct porosity is not far off the Apparent Porosity. The large separation X, Y between the neutron and density porosity measurement plots in log a) instead is strong evidence of the presence of gas in the formation, but the correct porosity is unknown.

The Density measurement type displayed from log a) is a so-called Neutron-Gamma measurement prototype, displaying a feature that conventional so-called Gamma-Gamma Density measurement types did not display, which is that the Density measurement overreacts to the presence of gas inside the pores by reading excessively low, and points to the evidence that this Density measurement has non-linear mixing-laws. However odd this may be, this remedies a standing difficulty and complication associated with conventional Gamma-Gamma Density measurements, which when taken in conjunction with Neutron measurements, do not have consonant mixing-laws, because conventional Gamma-Gamma Density measurements have linear mixing-laws, whereas Neutron measurements have non-linear mixing-laws in the presence of gas. By selecting Neutron-Gamma Density measurements instead, in conjunction with the same Neutron measurements, both these measurements with non-linear mixing-laws can constitute a pair of measurements with approximately consonant mixing-laws, and combine to give a linear gas characteristic Saturation Line on the corresponding crossplots. Another standing difficulty or complication associated with conventional Gamma-Gamma Density measurements is that they have a shallower depth-of-investigation when compared to Neutron measurements, meaning they are each affected differently by shallow invasion, not to mention depth-of-investigation dependence on formation hydrogen index and density (gamma-rays and neutrons can travel deeper into the formation, the more gas there is in the pores). By selecting Neutron-Gamma Density measurements instead, one can remedy yet this other problem, because Neutron-Gamma Density measurements read much deeper into the formation as compared to conventional Gamma-Gamma Density measurements, and when taken in conjunction with Neutron measurements, constitute a pair of measurements which meet the geometrical consonance criteria.

Both these discussed consonance criteria, the mixing-Laws consonance criteria and the geometrical consonance criteria, can be very useful because the routinely logged Neutron measurements are not consonant with anything else (i.e., any other measurements besides the Neutron-Gamma Density measurements), and to complicate matters further, there does not exist one Neutron measurement but indeed many such Neutron measurements types, many of which have not been completely studied and characterized to model the measurement's response for predetermined gas characteristics, or to fully appreciate invasion effects and document radial response J-functions. For example, Neutron Source type may vary between different Neutron measurements, and neutron source energy will affect the depth that neutrons penetrate inside the formation (conventional $^{241}$AmBe Neutron Sources emit 14 MeV neutrons, whereas electronic Pulsed-Neutron-Generators such as minitrons, emit 14 Mev neutrons). Or, for example, Neutron Detector type may vary between different Neutron measurements, and various Neutron Detector types or tool collar thicknesses do result in a wide range of thermal and epithermal neutron count combinations (ranging from predominantly thermal to predominantly epithermal), affecting the relative importance of diffusion effects in gas-bearing formations, and thereby altering and modifying the corresponding Neutron measurement mixing-laws. Or, for example, Neutron Tool Design may vary between different Neutron measurements, and source-to-detector spacing in particular, may lessen or magnify lithology and gas effects, also implying tool-specific mixing-laws. Therefore the introduced and discussed consonance criteria provide generally a satisfactory means, to proceed to determine correct porosity, when one of the first and second measurements includes a Neutron measurement.

Figure 8:
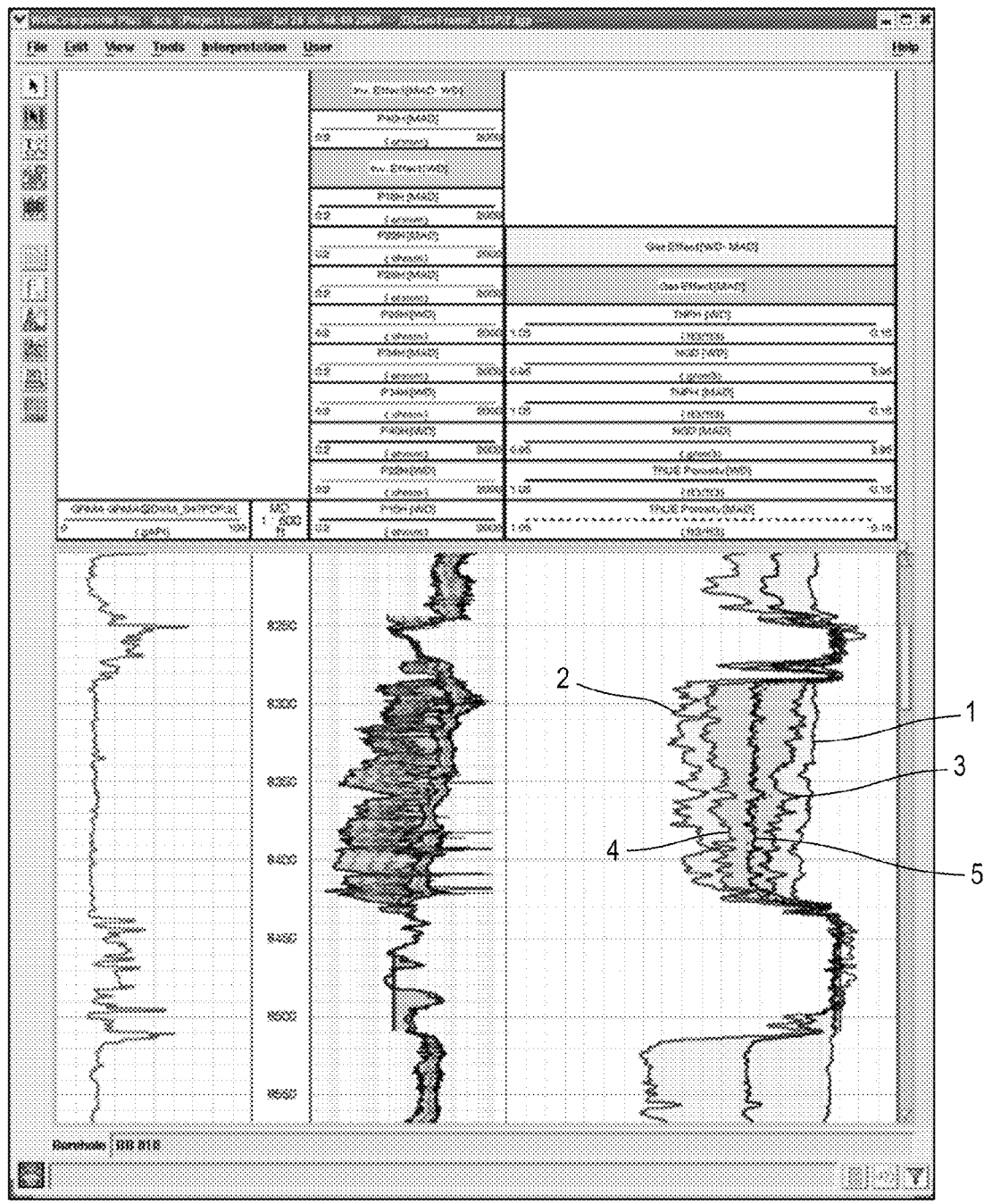
FIG. 8 shows density and neutron log measurements acquired in a time-lapse fashion.
Figure 9:
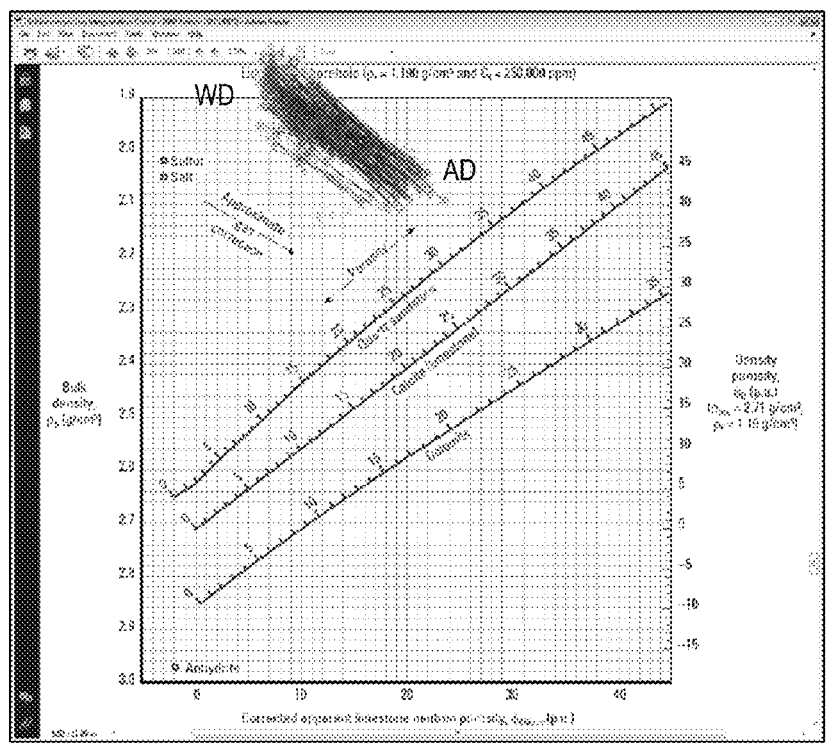
FIG. 9 shows a typical density-neutron log interpretation cross-plot with the deviated points from the while drilling (WD) and after drilling (AD) passes.

Taking the specific example of the Gamma-Gamma Density and Neutron measurements as shown in the example of FIG. 8, which displays simultaneously over a 200 ft depth interval, both Apparent Density Porosity and Apparent Neutron Porosity measurements data obtained at an early first time and with a large cross-over effect (in FIG. 8, Plot 1 is the while drilling Apparent Neutron Porosity, and Plot 2 is the while drilling Apparent Density Porosity), and obtained at a significantly delayed second time and with a reduced cross-over effect (in FIG. 8, Plot 3 is the after drilling Apparent Neutron Porosity, and Plot 4 is the after drilling Apparent Density Porosity); one can then generate FIG. 9 which shows a cross-plot of all the corresponding deviated points, whereby the y-axis is the Apparent Density Porosity $\phi_D$ and the x-axis is the Apparent Neutron Porosity $\phi_N$. The Mud-Filtrate Line in FIG. 9 is indicated as the "Calcite (limestone)" line, and the deviated points obtained at an early first time are distinguished from the deviated points obtained at a significantly delayed second time, using the shown mnemonics WD (while drilling) and AD (after drilling) respectively. Also shown in FIG. 9, are straight lines connecting the WD and AD deviated points. By extrapolating each of these connecting lines, which are supposed to represent at the same time the gas characteristic Saturation Lines and the Invasion Lines, back to the Mud-Filtrate Line, one can then obtain the correct porosity. These correct porosity readings determined geometrically and graphically can be expressed mathematically according to the following equation 5:

$$\Phi_{correct} = \frac{\Phi_N^{[a]} \cdot \Phi_D^{[w]} - \Phi_N^{[w]} \cdot \Phi_D^{[a]}}{(\Phi_D^{[w]} - \Phi_D^{[a]}) - (\Phi_N^{[w]} - \Phi_N^{[a]})} \quad \text{Equation 5}$$

where $\phi_D^{[w]}$, $\phi_D^{[a]}$, $\phi_N^{[w]}$, $\phi_N^{[a]}$ are respectively the Apparent Density Porosity while drilling, the Apparent Density Porosity after drilling, the Apparent Neutron Porosity while drilling, and the Apparent Neutron Porosity after drilling, and this equation does not make any use of gas properties, depth-of-invasion, or radial J-functions.

Equation 5 also shows that, in order to be able to estimate for $\phi_{correct}$, the denominator should be different from zero. This is not an issue when the pair of measurements considered in this equation include a first Density measurement and a second Neutron measurement, but may become an issue when considering other measurements. The general condition for the denominator to be different from zero is that the two different porosity measurements considered should be selected to behave differently in the presence of gas, where the first Apparent Porosity measurement indicates an increase in the presence of gas (e.g., the Density measurement), and the second Apparent Porosity measurement indicates a decrease in the presence of gas (e.g., most other measurements types).

In some implementations, equation 5 can be substituted with the following more general expression (Equation 5'), in those situations where measurements can be corrected for invasion, and the corresponding virgin zone only and flushed zone only measurements become available:

$$\Phi_{correct} = \frac{\Phi_N^{[fz]} \cdot \Phi_D^{[vz]} - \Phi_N^{[vz]} \cdot \Phi_D^{[fz]}}{(\Phi_D^{[vz]} - \Phi_D^{[fz]}) - (\Phi_N^{[vz]} - \Phi_N^{[fz]})}$$

where $\phi_D^{[vz]}$, $\phi_D^{[fz]}$, $\phi_N^{[vz]}$, $\phi_N^{[fz]}$ are respectively the Apparent Density Porosity of the virgin zone, the Apparent Density Porosity of the flushed zone, the Apparent Neutron Porosity of the virgin zone, and the Apparent Neutron Porosity of the flushed zone, and again this equation does not make any use of gas properties, depth-of-invasion, or radial J-functions, although depth-of-invasion and radial J-functions would have been used implicitly to correct for invasion.

In some implementations, equation 5 can also be substituted with the following expression (Equation 5"), in those situations where not only gas is present inside the formation, but both gas and light oil simultaneously:

$$\Phi_{correct} \approx \frac{\begin{vmatrix} \Phi_D^{[w]} & \Phi_D^{[a]} & \Phi_D^{[3]} \\ \Phi_N^{[w]} & \Phi_N^{[a]} & \Phi_N^{[3]} \\ \Phi_X^{[w]} & \Phi_X^{[a]} & \Phi_X^{[3]} \end{vmatrix}}{\begin{Bmatrix} +\Delta\Phi_{DN}^{[w]} \cdot \Phi_X^{[a]} + \Delta\Phi_{NX}^{[w]} \cdot \Phi_M^{[a]} + \Delta\Phi_{XD}^{[w]} \cdot \Phi_N^{[a]} \\ +\Delta\Phi_{DN}^{[a]} \cdot \Phi_X^{[3]} + \Delta\Phi_{NX}^{[a]} \cdot \Phi_M^{[3]} + \Delta\Phi_{XD}^{[a]} \cdot \Phi_N^{[3]} \\ +\Delta\Phi_{DN}^{[3]} \cdot \Phi_X^{[w]} + \Delta\Phi_{NX}^{[3]} \cdot \Phi_M^{[w]} + \Delta\Phi_{XD}^{[3]} \cdot \Phi_N^{[w]} \end{Bmatrix}}$$

wherein $\phi_D^{[w]}$, $\phi_D^{[a]}$, $\phi_N^{[w]}$, $\phi_N^{[a]}$ are respectively the Apparent Density Porosity while drilling, the Apparent Density Porosity after drilling, the Apparent Neutron Porosity while drilling, and the Apparent Neutron Porosity after drilling, with $\phi_D^{[3]}$ and $\phi_N^{[3]}$ representing additional Apparent Density Porosity and Apparent Neutron Porosity measurements at a third time, with "X" representing an additional measurement fully consonant with the selected Density and Neutron measurements, and $\phi_X^{[w]}$, $\phi_X^{[a]}$, and $\phi_X^{[3]}$ representing the Apparent Porosity derived from the "X" measurement while drilling, after drilling, and at a third time respectively, and with $\phi_{DN}^{[w]}$ representing the difference ($\phi_N^{[w]}-\phi_D^{[w]}$), and so on. And this equation does not make any use of gas or light oil properties, depth-of-invasion or invasion profile, or radial J-functions.

The exact expressions for the Apparent Density Porosity and for the Apparent Neutron Porosity to be used in the above equation 5 (or the substitute equations 5' and 5"), are expressed as follows in equation 6:

$$\Phi_D = \frac{(D_{log} - D_{k\_mtx}) - (D_{W\_irr} - D_{M\_filt}) \cdot V_{W\_irr}}{(D_{M\_filt} - D_{k\_mtx})} \quad \text{Equation 6}$$

and $$\Phi_N = \frac{(N_{log} - N_{k\_mtx}) - (N_{W\_irr} - N_{M\_filt}) \cdot V_{W\_irr}}{(N_{M\_filt} - N_{k\_mtx})}$$

where $D_{k\_mtx}$ is the Density measurement reading, of the known rock matrix, as derived from Thermal Neutron Capture Spectroscopy measurements, or derived through any other means; $D_{W\_irr}$ is the Density measurement reading, of the irreducible water; $D_{M\_filt}$ is the Density measurement reading, of the mud filtrate; $D_{log}$ is the actual measured Density log of the underground formation; $N_{k\_mtx}$ is the Neutron log reading, of the known rock matrix (typically the clay part, because of the associated so-called clay-bound water), as derived from Thermal Neutron Capture Spectroscopy measurements, or derived through any other means; $N_{W\_irr}$ is the Neutron log reading, of the irreducible water, assuming the rock matrix is known, as derived from Thermal Neutron Capture Spectroscopy measurements mentioned above, or derived through any other means; $N_{M\_filt}$ is the Neutron log reading, of the mud filtrate, assuming the rock matrix is known, as derived from Thermal Neutron Capture Spectroscopy measurements mentioned above, or derived through any other means; $N_{log}$ is the actual measured Neutron log of the underground formation; and $V_{W\_irr}$ is the percentage of irreducible water present in the underground formation, by volume (and is considered available a-priori).

Figure 10:
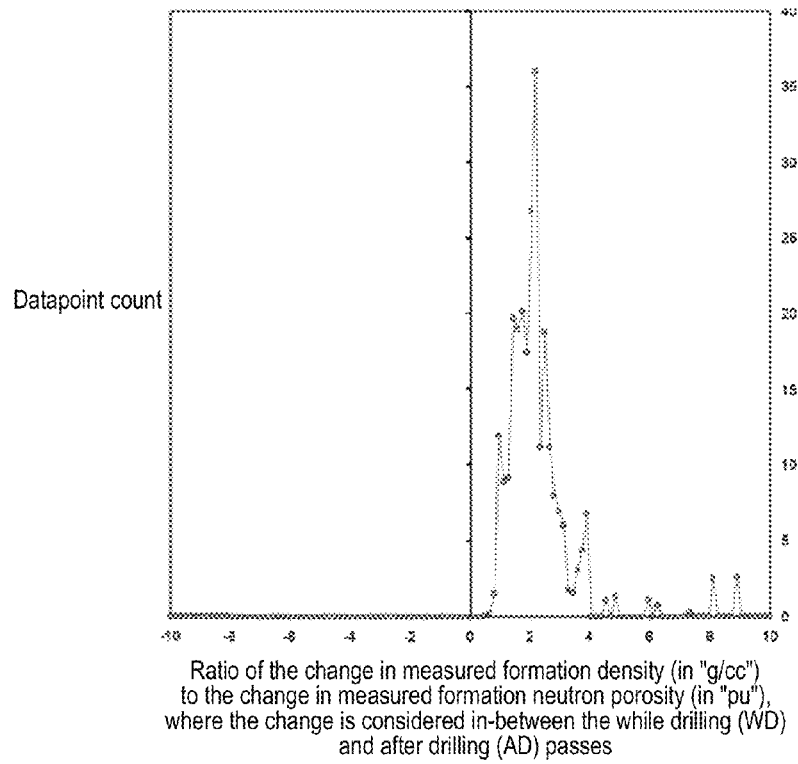
FIG. 10 shows a histogram of the computed gradients of the various straight lines connecting the while drilling (WD) and after drilling (AD) deviated points.

FIG. 10 shows a histogram of the computed gradients of the various lines connecting the WD and AD deviated points (expressed here in $10^{-2}$ g/cc per pu) using the 261 data samples from FIG. 9. As can be seen, the sharp and narrow peak around 2 $10^{-2}$ g/cc per pu is strong evidence that the gas characteristic Saturation Lines and Invasion Lines include approximately superimposed straight lines, and that Gamma-Gamma Density measurements and Neutron Measurements are approximately fully consonant (i.e., meet simultaneously both geometrical consonance and mixing-Laws consonance criteria).

The above equations for $\phi_{correct}$, when applied point-by-point (i.e., depth-by-depth along a drilled well), can have a wide range of applicability, especially where different gas types are present in different reservoir sections, or where gas pressure and temperature may vary significantly between different reservoir sections. However, for the above equations for $\phi_{correct}$ to work best, the while drilling and after drilling log datasets should have accurately depth-matched beforehand, and the deviated WD and AD points in FIG. 9 should also be sufficiently separated from each other, such that the straightlines connecting the deviated WD and AD points can be projected reliably onto the Mud-Filtrate line, without too much error. Another more reliable way to estimate the gas characteristic Saturation Lines, when dealing with only one type of gas, is to assign instead a single and same value to the gradient of the gas characteristic Saturation Lines and Invasion Lines, and to use this gradient value to project deviated points back onto the Mud-Filtrate Line, without having to do it connecting line by connecting line. This is justified by the fact that in theory indeed all the connecting lines are expected to have the same gradient as follows in equation 7:

$$\Lambda_{D/N} \cong \frac{\left(\frac{D_{u\_Gas} - D_{M\_filt}}{D_{k\_mtx} - D_{M\_filt}}\right)}{\left(\frac{N_{u\_Gas} - N_{M\_filt}}{N_{k\_mtx} - N_{M\_filt}}\right)} \qquad \text{Equation 7}$$

which is arrived at, by taking the mathematical derivatives of the Apparent Porosity expressions above; and where $D_{M\_filt}$ is the Density measurement reading of the mud filtrate; $N_{M\_filt}$ is the Neutron measurement reading of the mud filtrate; $D_{u\_Gas}$ is the unknown Density measurement reading of the gas; and $N_{u\_Gas}$ is the unknown Neutron measurement reading of the gas.

The single value assigned to this gradient may be achieved through a variety of statistical techniques. For example, one can use the histogram of FIG. 10, and take the median value, or take the average value. Or, for example, one can average the WD and AD Apparent Density Porosity and Apparent Neutron Porosity first, and take the single value to be represented by equation 8:

$$\Lambda_{D/N} \cong \frac{\text{Average}(\Phi_D^{[g]}(z)) - \text{Average}(\Phi_D^{[w]}(z))}{\text{Average}(\Phi_N^{[g]}(z)) - \text{Average}(\Phi_N^{[w]}(z))} \qquad \text{Equation 8}$$

where "$z$" refers to a depth index along the drilled well. Or, for example, one can try to take a least-square-fit approach, which leads yet to the following expression in equation 9 for the optimal single value to use:

$$\Lambda_{D/N} \cong \frac{\text{sum}_z\{((\Phi_D^{[g]}(z) - \Phi_D^{[w]}(z)) - (\Phi_N^{[g]}(z) - \Phi_N^{[w]}(z))) \cdot (\Phi_D^{[g]}(z) - \Phi_D^{[w]}(z))\}}{\text{sum}_z\{((\Phi_D^{[g]}(z) - \Phi_D^{[w]}(z)) - (\Phi_N^{[g]}(z) - \Phi_N^{[w]}(z))) \cdot (\Phi_N^{[g]}(z) - \Phi_N^{[w]}(z))\}} \qquad \text{Equation 9}$$

Once this single and same value has been selected for the gradient of the gas characteristic Saturation Lines and Invasion Lines, it becomes possible to determine a first $\phi_{correct}$ using the deviated points WD obtained at the early first time only (see, e.g., FIG. 8, Plot 5), and a second $\phi_{correct}$ using the deviated points AD obtained at the significantly delayed second time (see, e.g., FIG. 8, Plot 6, which can hardly be distinguished from Plot 5, because they overlay so well as they should do), as follows in equation 10:

$$\Phi_{correct}^{[w]} = \frac{\Phi_D^{[w]} - \Lambda_{D/N} \cdot \Phi_N^{[w]}}{1 - \Lambda_{D/N}} \qquad \text{Equation 10}$$

and

-continued $$\Phi_{correct}^{[a]} = \frac{\Phi_D^{[a]} - \Lambda_{D/N} \cdot \Phi_N^{[a]}}{1 - \Lambda_{D/N}}$$

These first and second $\phi_{correct}$ can then be used to fine-tune any depth-mismatches between the log measurement datasets obtained in a time-lapse fashion, because the compounded effects of invasion, effective porosity and permeability variations can occasionally make it difficult to depth-match such datasets. Once the while drilling and the after drilling datasets have been depth-matched using the first and the second $\phi_{correct}$ as described, a further iteration of the methodology described above can be performed using the newly depth-matched log measurement datasets.

If one of the gas characteristics is already known, such as gas Density which may be available from existing downhole formation pressure gradient measurements, then the expression in equation 7 can also be used to back-calculate the other characteristics of the gas in relation to other measurements present in equation 7, such as Neutron response and Hydrogen Index characteristics, and make it possible to identify different gas types.

Figure 11:
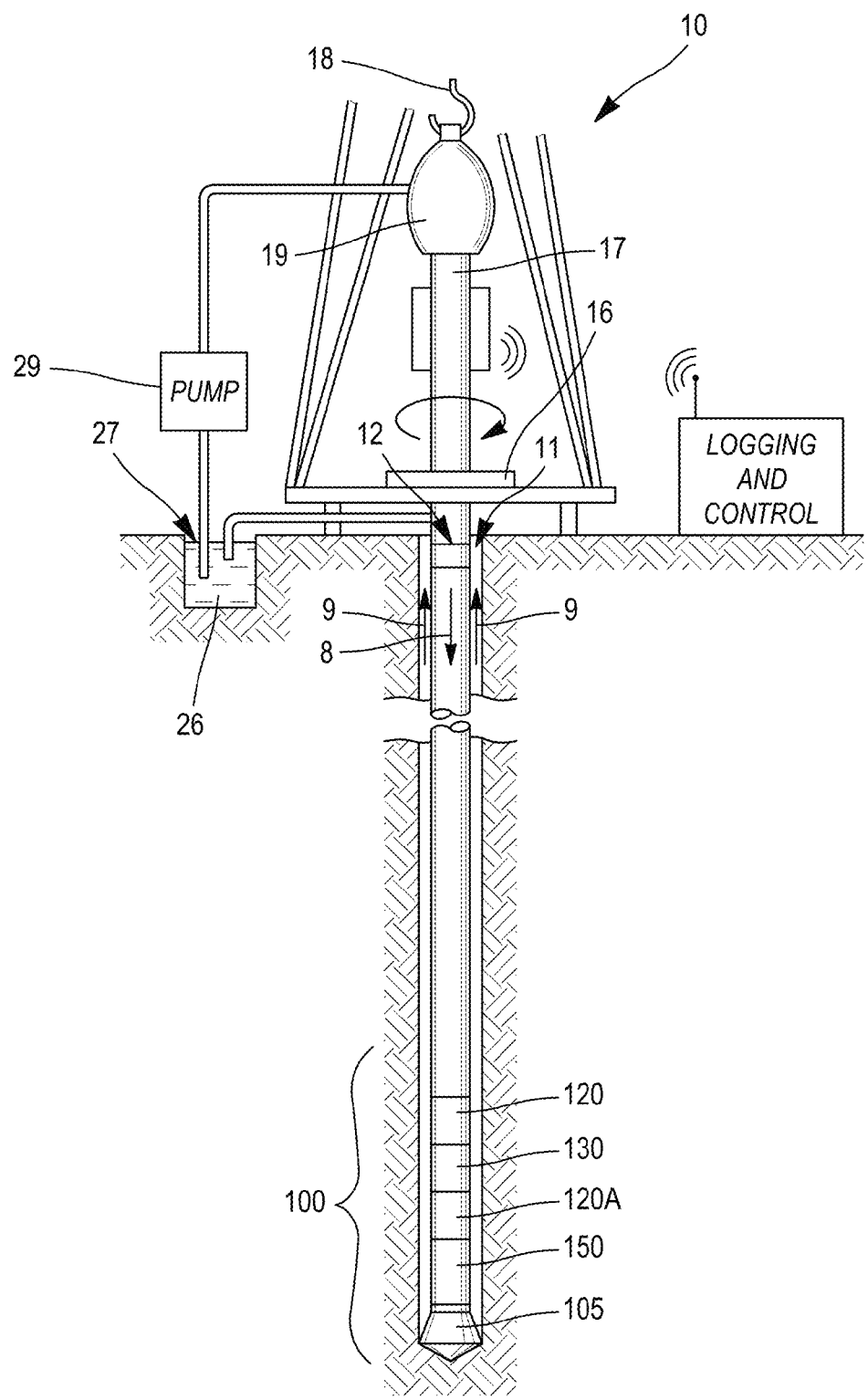
FIG. 11 shows an example of a wellsite in which embodiments can be carried out.

FIG. 11 shows a wellsite system in which embodiments of this disclosure can be employed. The wellsite can be onshore or offshore. In this exemplary system, a borehole 11 is formed in subsurface formations by rotary drilling in a manner that is well known. Further embodiments of this disclosure can also use directional drilling.

A drill string 12 is suspended within the borehole 11 and has a bottomhole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottomhole assembly 100 of the illustrated embodiment includes a logging-while-drilling (LWD) module 120, a measuring-while-drilling (MWD) module 130, a rotary-steerable system and motor, and drill bit 105.

The LWD module 120 is housed in a special type of drill collar, as is known in the art, and can contain one or a plurality of known types of logging tools. It will also be understood that more than one LWD and/or MWD module can be employed, e.g., as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a nuclear measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick slip measuring device, a direction measuring device, and an inclination measuring device.

Figure 12:
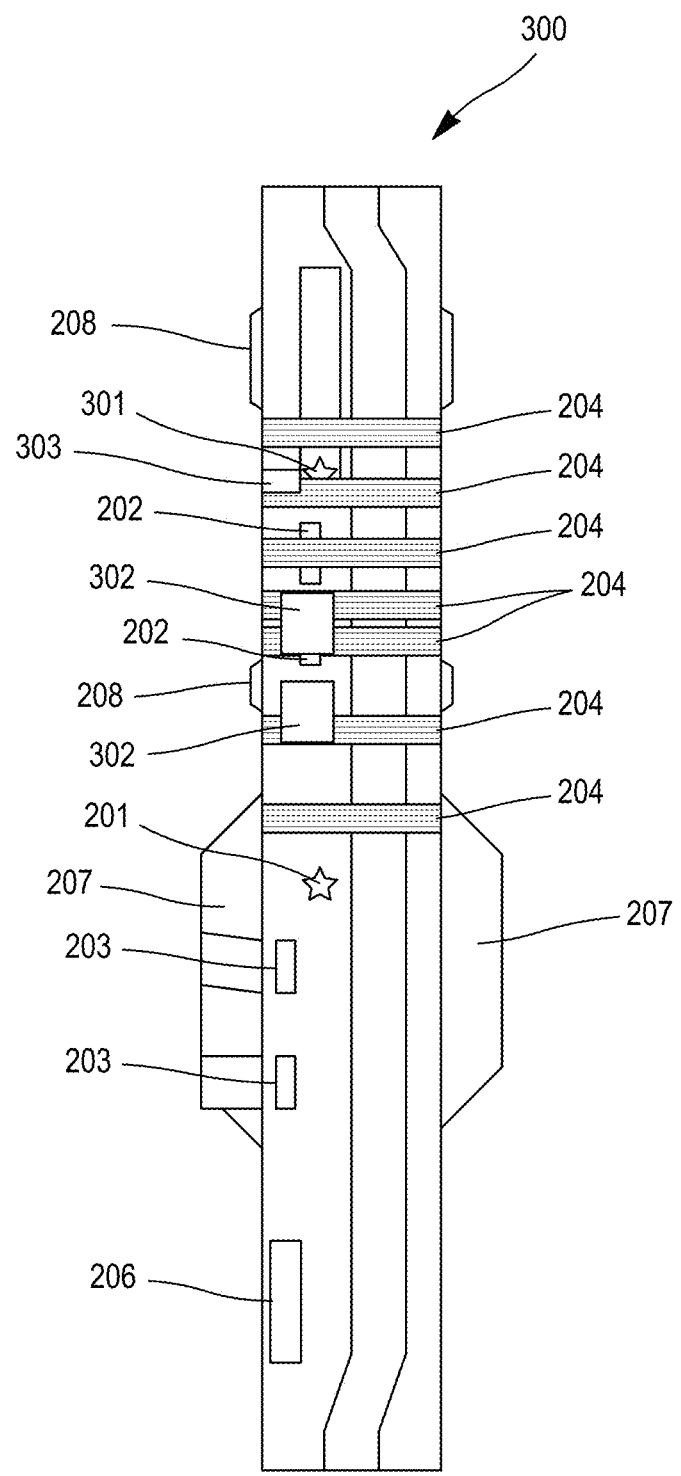
FIG. 12 shows an example of a logging tool according to which the embodiments can be carried out.

FIG. 12 shows an example of a tool 300 according to an embodiment of this disclosure. It should be appreciated that this tool 300 could be located in the position 120 or 130 of the tool string of FIG. 11. Alternatively, the tool 300 could be a WL tool attached to a wireline for WL logging.

To perform a sigma measurement for example, a pulsed neutron source 301 is used. However, other neutron producing reactions can also be employed. The tool shown in FIG. 12 also includes gamma-ray detectors 302. In addition to the gamma-ray detectors 302, neutron detectors 202 can also be located in the tool.

The neutron detectors 202 are located at two different distances from the pulsed neutron source 301. The neutron detectors 202 are thermal and/or epithermal neutron detectors. The tool 300 further comprises for example two gamma ray detectors 302 interleaved with the neutron detectors 202. A neutron monitor 303 is mounted in proximity of the neutron source 301 to determine or monitor the output of the neutron source. The measurement of the output of the neutron source may be used to normalize count rates measured at the neutron detectors 202 or the gamma-ray detectors 302. It may also be used to regulate the neutron source output. The neutron monitor 303 may typically be realized with a plastic scintillator that detects recoil protons.

The gamma ray detectors 302 can be realized using scintillation detectors, e.g., NaI(Tl), BGO, CsI, GSO etc. Each gamma ray detector 302 is located at a different distance from the neutron source 301. A detector 302 located at the smallest distance from the source 301 may be used for a determination of an elemental composition of the formation by measurement and analysis of capture gamma ray spectra. The gamma-ray detectors 302 may furthermore be used to measure a decay of thermal gamma rays in order to deduce a neutron capture cross section (sigma) of the formation and of the borehole. In addition, the latter detector 302 may be used to measure gamma ray spectra from inelastic reactions of high energy neutrons. These gamma ray spectra can be analyzed in order to add to the measurement of an elemental composition of the formation and/or for compensation of the neutron-gamma density measurement.

While FIG. 12 shows the neutron detectors 202 and the gamma ray detectors 302 in alternating positions, it is understood that this is an example only and that other positions may be envisaged. For example, neutron detectors 202 and gamma ray detectors 302 may be located at a same distance from the source 301, next to each other or integrated in order to produce simultaneous neutron and gamma ray measurements. It can also be envisaged that the gamma-ray detectors are located above the neutron source and the neutron detectors below the neutron source. Additionally, it is possible to determine the decay of the thermal neutron population and therefore sigma directly with the thermal neutron detectors.

It should be noted that these sensors described above can be replaced with other types of sensors such as density sensors, and as such a tool having multiple sensors will allow for first and second and additional measurements to be carried out.

To summarize, aside from the "Photo-Electric Absorption Cross-Section" measurement, in combination with "Elemental Thermal Neutron Capture Spectroscopy" measurements, both of which may not be available for a variety of reasons, the estimation of correct porosity in gas-bearing underground formations typically utilizes the combination of at least two different measurement types, one being a "Density" type measurement and the other being a "non-Density" type measurement. The systems and techniques involved were essentially developed, prior to the advent of Logging-While-Drilling (LWD) techniques, and were primarily designed for Wireline (WL) measurements, obtained usually a few days after drilling, at a time depth-of-invasion can be simply assumed to have progressed significantly beyond most measurements depth-of-investigation. Instead, the introduction of LWD techniques implies measurements obtained usually a few minutes to a few hours after drilling, and reading across partially-invaded formations, preventing the direct application of earlier WL techniques, without adversely affecting the quality of the resulting porosity estimates. However, LWD techniques may still be advantageous over WL techniques, because mud-filtrate invasion may mask the presence of gas in the pores, which is not really desired. Moreover, for all the techniques designed in the context of WL measurements, gas characteristics should be known beforehand, which may not always be the case (gas composition, PVT diagram, temperature and pressure).

Embodiments of this disclosure address and remedy these shortcomings, depending on the various available measurements consonance features, depending on the availability of depth-of-invasion measurement(s), or predetermined gas characteristics beforehand, and depending on whether the measurements were acquired only once, or in a time-lapse fashion (i.e., the combination of measurements obtained at an early first time, "while drilling", and at a delayed second time "after drilling").

For Equation 1

Figure 6:
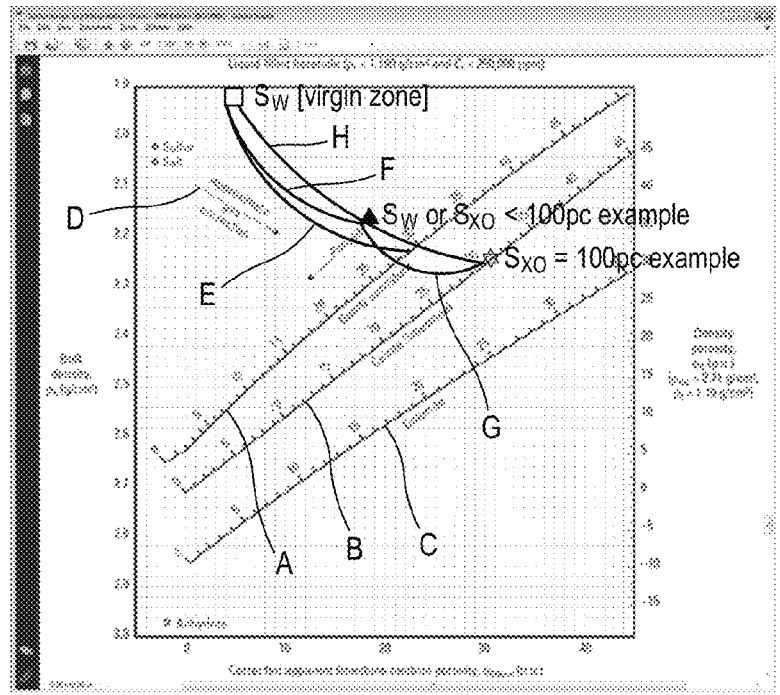
FIG. 6 shows a typical density-neutron log interpretation cross-plot.

Invasion Effects/Geometrical Consonance i. The effect of invasion on the Neutron measurement can be described by the evolution of the Neutron measurement with time:

$$N_{log}(d_i(t)) = N_{log}^{[fz]} \cdot J_N(d_i(t)) + N_{log}^{[vz]} \cdot (1 - J_N(d_i(t)))$$

where $d_i(t)$ is the depth-of-invasion as a function of time t; $J_N(d_i(t))$ is the radial response J-function of the Neutron measurement; $N_{log}^{[fz]}$ is the Neutron measurement reading of the underground formation, corresponding to the flushed zone; $N_{log}^{[vz]}$ is the Neutron measurement reading of the underground formation, corresponding to the virgin zone; and $N_{log}(d_i(t))$ is the actual Neutron measurement reading of the underground formation, corresponding to a partially flushed underground formation.

ii. Similarly, the effect of invasion on the Density measurement can be described by the evolution of the Density measurement with time:

$$D_{log}(d_i(t)) = D_{log}^{[fz]} \cdot J_D(d_i(t)) + D_{log}^{[vz]} \cdot (1 - J_D(d_i(t)))$$

where $d_i(t)$ is the depth-of-invasion as a function of time t; $J_D(d_i(t))$ is the radial response J-function of the Density measurement; $D_{log}^{[fz]}$ is the Density measurement reading of the underground formation, corresponding to the flushed zone; $D_{log}^{[vz]}$ is the Density measurement reading of the underground formation, corresponding to the virgin zone; and $D_{log}(d_i(t))$ is the actual Density measurement reading of the underground formation, corresponding to a partially flushed underground formation.

iii. With these two pieces of information, the way the neutron-density measurement crossplots and moves about on FIG. 6 with time will be as follows:

$$\begin{pmatrix} N_{log}(d_i(t)) \\ D_{log}(d_i(t)) \end{pmatrix} - \begin{pmatrix} N_{log}^{[vz]} \\ D_{log}^{[vz]} \end{pmatrix} = \begin{pmatrix} N_{log}^{[fz]} - N_{log}^{[vz]} \\ D_{log}^{[fz]} - D_{log}^{[vz]} \end{pmatrix} \cdot \frac{J_N(d_i(t)) + J_D(d_i(t))}{2} +$$
$$\begin{pmatrix} N_{log}^{[fz]} - N_{log}^{[vz]} \\ -(D_{log}^{[fz]} - D_{log}^{[vz]}) \end{pmatrix} \cdot \frac{J_N(d_i(t)) - J_D(d_i(t))}{2}$$

where
the first vector $$\begin{pmatrix} N_{log}^{[fz]} - N_{log}^{[vz]} \\ D_{log}^{[fz]} - D_{log}^{[vz]} \end{pmatrix}$$

in the sum is weighted by the average of the Neutron measurement J-function and the Density measurement J-function and represents an overall linear trend; and
the last vector $$\begin{pmatrix} N_{log}^{[fz]} - N_{log}^{[vz]} \\ -(D_{log}^{[fz]} - D_{log}^{[vz]}) \end{pmatrix}$$

in the sum is weighted by the difference in the Neutron measurement J-function and the Density measurement J-function, and hence any mismatch in-between the J-functions (such as due to a difference in depth-of-investigation) causes the linear trend of the gas correction to distort and become curved, as indicated by lines E, F and G of FIG. 6. If instead the Neutron measurement and the Density measurement have consonant geometrical response (i.e., approximately similar J-functions), then the curved lines E, F and G of FIG. 6 would include straight lines.

For Equation 2

Non-Linear Mixing-Laws/Mixing-Laws Consonance i. Aside from invasion effects, and considering uniform underground formations with variation of only gas and water relative proportions (i.e., with varying so-called gas saturation and water saturation, commonly referred to as $S_g$ and $S_w$ respectively, whereby $S_g + S_w = 1$), the effect of gas saturation on the Neutron measurement can be described by the evolution of the Neutron measurement with saturation:

$$N(\phi, S_g) = N(\phi, 1) \cdot S_g^{[N]}(\phi, S_g) + N(\phi, 0) \cdot (1 - S_g^{[N]}(\phi, S_g))$$

where $N(\phi, S_g)$ is the Neutron measurement reading, for uniform underground formation, of porosity $\phi$, and gas saturation $S_g$; $N(\phi, 0)$ is the Neutron measurement reading, for uniform underground formation, of porosity $\phi$, and gas saturation "0" (with no gas in the formation pores); $N(\phi, 1)$ is the Neutron measurement reading, for uniform underground formation, of porosity $\phi$, and gas saturation "1" (with only gas in the formation pores); and $$S_g^{[N]}(\Phi, S_g) = \frac{N(\Phi, S_g) - N(\Phi, 0)}{N(\Phi, 1) - N(\Phi, 0)}$$

is the "apparent" gas saturation of the underground formation, for uniform underground formation, of porosity $\phi$, and gas saturation $S_g$, as computed from the Neutron measurement reading only, "as if with linear mixing-laws".

ii. Likewise, and considering uniform underground formations with variation of only gas and water relative proportions, the effect of gas saturation on the Density measurement can be described by the evolution of the Density measurement with saturation:

$$D(\phi, S_g) = D(\phi, 1) \cdot S_g^{[D]}(\phi, S_g) + D(\phi, 0) \cdot (1 - S_g^{[D]}(\phi, S_g))$$

where $D(\phi, S_g)$ is the Density measurement reading, for uniform underground formation, of porosity $\phi$, and gas saturation $S_g$; $D(\phi, 0)$ is the Density measurement reading, for uniform underground formation, of porosity $\phi$, and gas saturation "0" (with no gas in the formation pores); $D(\phi, 1)$ is the Density measurement reading, for uniform underground formation, of porosity $\phi$, and gas saturation "1" (with only gas in the formation pores); and $$S_g^{[D]}(\Phi, S_g) = \frac{D(\Phi, S_g) - D(\Phi, 0)}{D(\Phi, 1) - D(\Phi, 0)}$$

is the "apparent" gas saturation of the underground formation, for uniform underground formation, of porosity $\phi$, and gas saturation $S_g$, as computed from the Density measurement reading only, "as if with linear mixing-laws".

iii. With these two pieces of information, the way the neutron-density measurement crossplots and moves about on FIG. 6 with gas saturation will be as follows:

$$\begin{pmatrix} N(\Phi, S_g) \\ D(\Phi, S_g) \end{pmatrix} - \begin{pmatrix} N(\Phi, 0) \\ D(\Phi, 0) \end{pmatrix} =$$
$$\begin{pmatrix} N(\Phi, 1) - N(\Phi, 0) \\ D(\Phi, 1) - D(\Phi, 0) \end{pmatrix} \cdot \frac{S_g^{[N]}(\Phi, S_g) + S_g^{[D]}(\Phi, S_g)}{2} +$$
$$\begin{pmatrix} N(\Phi, 1) - N(\Phi, 0) \\ -(D(\Phi, 1) - D(\Phi, 0)) \end{pmatrix} \cdot \frac{S_g^{[N]}(\Phi, S_g) - S_g^{[D]}(\Phi, S_g)}{2}$$

wherein
the first vector $$\begin{pmatrix} N(\Phi, 1) - N(\Phi, 0) \\ D(\Phi, 1) - D(\Phi, 0) \end{pmatrix}$$

in the sum is weighted by the average of the Neutron measurement "apparent gas saturations" and the Density measurement "apparent gas saturations" and represents an overall linear trend; and the last vector $$\begin{pmatrix} N(\Phi, 1) - N(\Phi, 0) \\ -(D(\Phi, 1) - D(\Phi, 0)) \end{pmatrix}$$

in the sum is weighted by the difference in the Neutron measurement "apparent gas saturations" and the Density measurement "apparent gas saturations", and hence any mismatch in the "apparent gas saturations" (such as due to one of the measurements having linear mixing-laws, and the other measurement having non-linear mixing-laws) causes the linear trend of the gas correction to distort and become curved, as indicated by line H of FIG. 6. If instead the Neutron measurement and the Density measurement have consonant mixing-laws (i.e., satisfying the condition that they approximately both respond "proportionately to each other" in the presence of gas), then $$\frac{D(\Phi, S_g) - D(\Phi, 0)}{N(\Phi, S_g) - N(\Phi, 0)}$$

is approximately independent of gas saturation, $S_g^{[N]}(\phi, S_g) - S_g^{[D]}(\phi, S_g)$ is correspondingly approximately zero, and the curved line H of FIG. 6 would include a straight line.

For Equations 3 and 4

The index g stands for the gas phase;
The index G stands for the liquid phase
The index w stands for while drilling
The index a stands for after drilling
The index fz stands for the flushed zone
The index vz stands for the virgin zone
M is the first measurement
m is the second measurement
π is the third additional measurement
P is the fourth additional measurement
$d_i$ is for depth-of-invasion
J's are the radial response J-functions
$V_G^{[fz]}$ is the overall percentage, by volume, of liquid present in the underground formation, in the flushed zone;
$V_G^{[vz]}$ is the overall percentage, by volume, of liquid in the underground formation, in the virgin zone;
$V_g^{[fz]}$ is the overall percentage, by volume, of gas present in the underground formation, in the flushed zone;
$V_g^{[vz]}$ is the overall percentage, by volume, of gas present in the underground formation, in the virgin zone;
$\Delta M_G = M_G - M_{k\_mtx}$;
$\Delta M_g = M_g - M_{k\_mtx}$;
$\Delta m_G = m_G - M_{k\_mtx}$;
$\Delta m_g = m_g - m_{k\_mtx}$;
$\Delta \pi_G = \pi_G - \pi_{k\_mtx}$;
$\Delta \pi_g = \pi_g - \pi_{k\_mtx}$;
$\Delta P_G = P_G - P_{k\_mtx}$;
$\Delta P_g = P_g - P_{k\_mtx}$;
$\Delta M_1 = M_1 - M_{k\_mtx}$;
$\Delta m_1 = m_1 - M_{k\_mtx}$;
$\Delta \pi_1 = \pi_1 - \pi_{k\_mtx}$;
$\Delta P_1 = P_1 - P_{k\_mtx}$;
$j_M(d_i) = 1 - J_M(d_i)$;
$j_m(d_i) = 1 - J_m(d_i)$;
$j_\pi(d_i) = 1 - J_\pi(d_i)$;
$j_P(d_i) = 1 - J_P(d_i)$;
$J_M(d_i)$ is the radial response J-functions of the measurement M;
$J_m(d_i)$ is the radial response J-functions of the measurement m;
$J_\pi(d_i)$ is the radial response J-functions of the measurement π;
$J_P(d_i)$ is the radial response J-functions of the measurement P;
$M_{k\_mtx}$ is the known M measurement reading of the rock matrix, as derived from the "Thermal Neutron Capture Spectroscopy" measurements, or any other means;
$M_G$ is the M measurement reading, assigned to liquids;
$M_g$ is the M measurement reading, assigned to the gas;
$m_{k\_mtx}$ is the known m measurement reading of the rock matrix, as derived from the "Thermal Neutron Capture Spectroscopy" measurements, or any other means;
$m_G$ is the m measurement reading, assigned to liquids;
$m_g$ is the m measurement reading, assigned to gas;
$\pi_{k\_mtx}$ is the known π measurement reading of the rock matrix, as derived from the "Thermal Neutron Capture Spectroscopy" measurements, or any other means;
$\pi_G$ is the π measurement reading, assigned to liquids;
$\pi_g$ is the π measurement reading, assigned to gas;
$P_{k\_mtx}$ is the known P measurement reading of the rock matrix, as derived from the "Thermal Neutron Capture Spectroscopy" measurements, or any other means;
$P_G$ is the P measurement reading, assigned to liquids;
$P_g$ is the P measurement reading, assigned to gas;
$M_1$ is the actual M measurement reading, across the partially-invaded underground formation;
$m_1$ is the actual m measurement reading, across the partially-invaded underground formation;
$\pi_1$ is the actual π measurement reading, across the partially-invaded underground formation; and
$P_1$ is the actual P measurement reading, across the partially-invaded underground formation.

The invention claimed is:

1. A method of determining a porosity of a formation surrounding a borehole, the method comprising the steps of:
   injecting a drilling fluid that penetrates a distance into the formation as a function of time:
   obtaining a first porosity measurement and a second porosity measurement, wherein the first porosity measurement is a first type apparent porosity measurement and the second porosity measurement is a second type apparent porosity measurement, wherein the first and second porosity measurements provide different porosity measurement values in a presence of a gas having a known characteristic;
   wherein obtaining the first porosity measurement and the second porosity measurement comprises obtaining the first porosity measurement and the second porosity measurement, both taken at a first time and at a second time; and
   wherein the first and second porosity measurements are selected to have substantially the same depth-of-investigation into the formation and are affected approximately proportionally by the gas; and
   determining the porosity of the formation using the first and second porosity measurements and the known gas characteristic, wherein determining the porosity of the formation comprises determining the porosity of the formation from an intersection point between a line connecting two data points representing the first and second porosity measurements respectively taken at the first and second times and a line representing formation porosity values in an absence of the gas.

2. The method of claim 1, comprising:
obtaining a third porosity measurement and a fourth porosity measurement at a third time that is different from the first and second times and at substantially dissimilar depths-of-investigation to the first and second porosity measurements and with respect to each other, wherein determining the porosity of the formation further comprises using third and fourth porosity measurements.

3. The method of claim 2, wherein the determining step comprises calculating a distance of penetration of the drilling fluid into the formation using the third and fourth porosity measurements; combining the first and second porosity measurements with the calculated distance of penetration to compute measurements respectively corresponding to virgin zone only and flushed zone only; and determining the porosity of the formation from an intersection point between a line connecting two data points representing the computed measurements respectively corresponding to virgin zone only and flushed zone only and a line representing formation porosity values in the absence of the gas.

4. The method of claim 1, wherein the first time is while drilling, whereas the second time is after drilling.

5. The method of claim 1, wherein the second porosity measurement is at least one of a neutron, NMR, dielectric, sigma and conductivity porosity measurement.

6. The method of claim 1, wherein the first and second porosity measurements have one or more of a geometrical consonance such that an invasion curve becomes linear.

7. The method of claim 1, wherein the first and second porosity measurements have a mixing-laws consonance such that a gas characteristic curve becomes linear.

8. The method of claim 1, wherein both invasion and gas characteristic curves include overlaying and identical linear projections, enabling a corrected porosity to be obtained from of an assumed Mud-Filtrate response.

9. A method of determining a porosity of a formation surrounding a borehole, the method comprising the steps of:
injecting a drilling fluid that penetrates a distance into the formation as a function of time:
obtaining a first porosity measurement and a second porosity measurement, wherein the first porosity measurement is a first type apparent porosity measurement and the second porosity measurement is a second type apparent porosity measurement, wherein the first and second porosity measurements provide different porosity measurement values in a presence of a gas having a known characteristic;
wherein obtaining the first porosity measurement and the second porosity measurement comprises selecting the first porosity measurement to indicate a different porosity measurement in the presence of a gas as compared to the second porosity measurement;
wherein the first and second porosity measurements are selected to have substantially the same depth-of-investigation into the formation and are affected approximately proportionally by the gas; and
determining the porosity of the formation using the first and second porosity measurements and the known gas characteristic, wherein the determining step comprises combining the first and second porosity measurements with the distance of penetration of the drilling fluid into the formation to compute measurements respectively corresponding to virgin zone only and flushed zone only; and determining the porosity of the formation from an intersection point between a line connecting two data points representing the computed measurements respectively corresponding to virgin zone only and flushed zone only and a line representing formation porosity values in the absence of the gas.

10. The method of claim 9, wherein obtaining the first porosity measurement and the second porosity measurement comprises obtaining both porosity measurements at substantially the same time and substantially the same depth-of-investigation into the formation, and wherein the method further comprises:
obtaining a third porosity measurement at a substantially dissimilar depth-of-investigation to the first and second porosity measurements and at the time at which the first and second porosity measurements are obtained; and
wherein determining the porosity of the formation further comprises using the third porosity measurements and a distance of penetration of the drilling fluid into the formation.

11. The method of claim 10, wherein the determining step comprises combining the first, second and third porosity measurements with the distance of penetration of the drilling fluid into the formation to compute measurements respectively corresponding to virgin zone only and flushed zone only; and determining the porosity of the formation from an intersection point between a curve of the known gas characteristic passing through two data points representing the computed measurements respectively corresponding to virgin zone only and flushed zone only and a line representing formation porosity values in the absence of the gas.

12. A tool capable of injecting a drilling fluid that penetrates a distance into the formation as a function of time as the tool drills into the formation; wherein the tool comprises:
one or more sensors configured to obtain a first porosity measurement and a second porosity measurement,
one or more processors,
wherein the one or more processor is configured to take both porosity measurements at a first time and at a second time,
wherein the first porosity measurement at each time is a first type apparent porosity measurement in the presence of a gas and the second porosity measurement at each time is a second type apparent porosity measurement in the presence of the gas,
wherein the one or more processor further enables that the first and second porosity measurements are selected to have the same depth-of-investigation into the formation and are affected approximately proportionally by the gas, and is configured to determine the porosity of the formation from an intersection point between a line connecting two data points representing the first and second porosity measurements respectively taken at the first and second times and a line representing formation porosity values in an absence of the gas.

* * * * *